United States Patent
Kalanithi et al.

(10) Patent No.: US 9,002,752 B2
(45) Date of Patent: Apr. 7, 2015

(54) TANGIBLE SOCIAL NETWORK

(75) Inventors: Jeevan James Kalanithi, San Francisco, CA (US); V. Michael Bove, Jr., Wrentham, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 1358 days.

(21) Appl. No.: 12/388,514

(22) Filed: Feb. 18, 2009

(65) Prior Publication Data

US 2009/0307592 A1    Dec. 10, 2009

Related U.S. Application Data

(60) Provisional application No. 61/029,552, filed on Feb. 18, 2008.

(51) Int. Cl.
*G06Q 99/00* (2006.01)
*G06F 3/00* (2006.01)
*G06F 3/02* (2006.01)
*G06F 3/023* (2006.01)
*G06F 3/0338* (2013.01)
*G06F 3/038* (2013.01)

(52) U.S. Cl.
CPC .............. *G06F 3/0219* (2013.01); *G06F 3/002* (2013.01); *G06F 3/023* (2013.01); *G06F 3/0338* (2013.01); *G06F 3/038* (2013.01)

(58) Field of Classification Search
USPC .......................................... 715/701, 702, 733
See application file for complete search history.

(56) References Cited

U.S. PATENT DOCUMENTS

| | | | | |
|---|---|---|---|---|
| 6,522,333 | B1 * | 2/2003 | Hatlelid et al. | 345/474 |
| 6,912,565 | B1 * | 6/2005 | Powers et al. | 709/205 |
| 7,477,873 | B2 * | 1/2009 | Tanaka et al. | 455/41.2 |
| 8,130,219 | B2 * | 3/2012 | Fleury et al. | 345/418 |
| 2004/0128283 | A1 * | 7/2004 | Wang et al. | 707/3 |

(Continued)

OTHER PUBLICATIONS

D. Merrill, J. Kalanithi and P. Maes. Siftables: Towards Sensor Network User Interfaces. In the Proceedings of the First International Conference on Tangible and Embedded Interaction (TEI'07). Baton Rouge, Louisiana, USA. 2007.*

(Continued)

*Primary Examiner* — Amanda Abrahamson
(74) *Attorney, Agent, or Firm* — Norma E. Henderson

(57) ABSTRACT

A tangible social network system comprises at least two interactive physical objects adapted for communicatively linking with each other, a visualization application for providing a visual representation of a user's tangible social network, and an object communication frame. An interactive physical object comprises a controller for forming a communicatively linked relationship with another interactive physical object and for receiving and responding to commands and data received from a linked object, and an audio or visual response subsystem. An object communication frame comprises a housing adapted to receive interactive physical objects, a communications subsystem for managing communications with installed objects and with interactive physical objects communicatively linked with installed objects, a controller, and a power subsystem for powering installed objects. The frame or objects may interact with a visualization application, comprising subsystems for receiving information about the user's tangible social network and deriving a representation of it, and a graphical user interface for providing the visual representation to the user.

28 Claims, 13 Drawing Sheets

(56) References Cited

U.S. PATENT DOCUMENTS

| | | | |
|---|---|---|---|
| 2006/0178968 A1* | 8/2006 | Jung et al. | 705/35 |
| 2007/0130001 A1* | 6/2007 | Jung et al. | 705/14 |
| 2007/0220575 A1* | 9/2007 | Cooper et al. | 725/118 |
| 2009/0083115 A1* | 3/2009 | Pearson et al. | 705/9 |

OTHER PUBLICATIONS

Barry, Barbara, StoryBeads: a wearable for distributed and mobile storytelling, MIT MS Thesis, 2000, pp. 169, Publisher: Massachusetts Institute of Technology, Published in: Cambridge, MA.

Barry, Barbara et al., StoryBeads: a wearable for story construction and trade, IEEE International Workshop on Networked Appliances, Nov. 2000, Publisher: IEEE.

Brave, Scott et al., inTouch: A Medium for Haptic Interpersonal Communication, CHI'97 Proceedings: Extended Abstracts on Human Factors in Computing Systems, Mar. 22, 1997, pp. 12, Publisher: ACM Press, Published in: New York, NY.

Chang, Angela et al., Lumitouch: an emotional communication device, CHI'01 Proceedings: Extended Abstracts on Human Factors in Computing Systems, Mar. 31, 2001, pp. 313-314, Publisher: ACM Press, Published in: New York, NY.

Kaye, Joseph et al., Communicating Intimacy One Bit at a Time, CHI'05 Proceedings: Extended Abstracts on Human Factors in Computing Systems, 2005, Publisher: ACM Press, Published in: New York, NY.

Kilkin-Gil, Ruth, Buddybeads: techno-jewelry for non-verbal communication within teenager girls groups, Personal Ubiquitous Computing, Dec. 6, 2005, pp. 106-109, vol. 10, Publisher: Springer-Verlag, Published in: London, UK.

Kuzuoka, Hideaki et al., Mediating Awareness and Communication through Digital but Physical Surrogates, CHI'99 Proceedings: Extended Abstracts on Human Factors in Computing Systems, May 15, 1999, pp. 11-12, Publisher: ACM Press, Published in: New York, NY.

Laibowitz, M. et al., Clique: A Tangible Social Network Interface, Sep. 2004, Publisher: internet publication, Published in: US.

Van Den Hoven, Elise et al., Personal souvenirs as ambient intelligent objects, sOc-EUSAI '05: Proceedings of the 2005 joint conference on Smart objects and ambient intelligence, Oct. 2005, p. 123-128, Publisher: ACM Press, Published in: New York, NY.

* cited by examiner

TANGIBLE SOCIAL NETWORK

RELATED APPLICATIONS

This application claims the benefit of U.S. Provisional Application Ser. No. 61/029,552, filed Feb. 18, 2008, the entire disclosure of which is herein incorporated by reference.

STATEMENT REGARDING FEDERALLY SPONSORED RESEARCH OR DEVELOPMENT

This invention was made with U.S. government support under Grant Numbers DGE-0202745-11 and DGE-0645960, awarded by the National Science Foundation. The government has certain rights in this invention.

FIELD OF THE TECHNOLOGY

The present invention relates to social networking applications and, in particular, to a system employing reciprocally exchanged interactive physical objects that automatically establish direct communication channels and can capture and display social link information.

BACKGROUND

As PC-based social networking applications such as Facebook and MySpace have soared in popularity, social networking tools are now being incorporated into many kinds of online spaces. It is clear that many people have a desire to create, maintain, and display their social connections. PC-based social networking applications have demonstrated that digital media can support these desires quite effectively. However, PC-based social networks have a number of limiting characteristics. First, PC-based social networks are tied to the conventions of the graphical user interface (GUI), keyboard, and mouse. While the GUI paradigm is without doubt hugely successful and important, its limitations have been well documented [see, e.g. Klemmer, S., Hartmann, B., Takayama, L., "How bodies matter: five themes for interaction design," Proceedings of the 6th ACM conference on Designing Interactive systems, New York, N.Y., USA, ACM Press (2006), 140-149]. These include, for example, poor ability to support collaborative work, single point of control (the cursor), poor ability to properly take advantage of foreground and background attention, and homogenization of task execution [Ishii, H., Ullmer, B., "Tangible bits: towards seamless interfaces between people, bits and atoms," CHI '97: Proceedings of the SIGCHI conference on Human factors in computing systems, New York, N.Y., USA, ACM Press (1997), 234-241]. Especially for social applications, the failure of GUI-based interactions to seamlessly and ambiently integrate into the user's physical world reduces their power to support a user's social behavior, which is behavior that often occurs, and until recently always occurred, in the physical realm.

PC-based social networks also often induce social behavior that strongly differs from behavior found in the physical world, most likely due to the ways in which purely virtual spaces differ from physical ones. For example, in virtual settings, identities can easily shift and multiply, message cost is almost nil, in that a message can be just as easily sent to a thousand people as to one, and information is generally freely available and searchable by the public [Donath, J., Boyd, D., "Public displays of connection", BT Technology Journal (2004) 22(4):71-82]. It is common to find users who have literally thousands of friends in an online space, even though such a number would seem ridiculous in terms of physical space. While more in-depth analyses provide some reasons for this [Boyd, D., "Friends, Friendsters, and Top 8: Writing Community into being on social network sites," First Monday (2003), 11(12)], it suffices to note that social networks in the virtual realm need not strongly correlate with social networks situated in the physical realm. By no means are these characteristics inherently bad, but they do suggest a significant break from pre-digital forms of social behavior.

The way in which users create a social network through forming links using a web-based application varies from application to application, and the signaling cost varies as well. In general, though, link formation is mediated by an explicit invitation process. A user first creates a profile, filling in personal information and the like. She can then invite friends. For example, the user types in a potential friend's email address and invites them to join her social network by clicking a button. The recipient will receive the invitation, usually via email, and can choose to accept or decline the link, also via a button click. The cost to produce a link then, is relatively low: a few clicks by both users, plus their willingness to send and accept the invitation. Declining links, however, is often perceived as rude. This fact tends to positively bias the creation of social links, as users would rather live with a weak link in their profile than upset the inviter. Donath and Boyd provide trenchant analyses of link formation, noting that the "friendships" formed on social networking sites are not equivalent to those found in the physical social milieu [Danah Boyd, "Friends, Friendsters, and Top 8: Writing Community into being on social network sites." First Monday, 11(12), December 2006; J. Donath and D. Boyd, "Public displays of connection," BT Technology Journal, 22(4):71-82, 2004]. Boyd lists thirteen factors people give for forming links, or "Friending," only three of which involve actual acquaintance with the person to-be-linked.

A great deal of theoretical and empirical scholarship has explored the ways in which people attach meaning to physical objects [See, e.g., Csikszentmihalyi, M., Rochberg-Halton, E., "The meaning of things: domestic symbols and the self," Cambridge University Press (1981)]. Following some of this work, social objects are defined to be a physical object in which the symbolic value of the object lies in how it represents a social relationship or relationships. A wedding ring is a fine example: its role is chiefly symbolic and it symbolizes the commitment two spouses make to one another. A social object can also symbolize wider group membership; for example, fraternity pins and military dog tags serve this function. Social objects are thus intimately entwined with our social lives; they serve as physical referents to our relationships and influence how we construct and maintain those relationships.

Some prior work has explored how physical objects acquire meaning and how designers can engage these meanings with tangible user interfaces. For example, Chang et. al. explore the power of objects as intimate communication channels with "LumiTouch" [Chang, A., Resner, B., Koerner, B., Wang, X., Ishii, H., "Lumitouch: an emotional communication device," CHI '01: extended abstracts on Human factors in computing systems, New York, N.Y., USA, ACM Press (2001), 313-314]. This work recognizes that photographs often act as social objects. Chang et. al. embed tactile and visual affordances into photo frames, allowing them to act as direct, ambient communication channels. A user can touch force-sensitive pads on one frame, causing different patterns of light to appear on a partnered frame. In this way, two people can connect over distance through objects that represent their relationship. LumiTouch thus reinforces the metaphorical role photographs already occupy. LumiTouch frames are explicitly coupled with particular people—the people represented by photographs in the partnered frames.

Elise van den Hoven and others have also argued that tangible interface research should include personal objects, or mementos [van den Hoven, E., Eggen, B., "Personal souvenirs as ambient intelligent objects," sOc-EUSAI '05: Proceedings of the 2005 joint conference on Smart objects and ambient intelligence, New York, N.Y., USA, ACM Press (2005), 123-128]. Her work includes both theoretical discussions of this argument, as well as experiments with tangible interfaces that include mementos.

Mugellini et. al.'s Memodules explicitly cites these arguments [Mugellini, E., Rubegni, E., Gerardi, S., Abou Khaled, O., "Using personal objects as tangible interfaces for memory recollection and sharing," TEI '07: Proceedings of the 1st international conference on Tangible and embedded interaction, New York, N.Y., USA, ACM Press (2007), 231-238]. Memodules lets users associate mementos with digital media. RFID tags are applied to a memento such as, for example, a seashell from a vacation to the beach. Using an RFID reader and a visual PC application, the object can be associated with arbitrary content. When placed on the reader later on, the object will conjure up that media based on the associations it has previously acquired. For example, a user could associate the seashell with sounds of the ocean and beach pictures; when the seashell is held over the memodules reader, the system plays back the ocean sounds and displays the beach pictures. The Memodules system represents an attempt to augment pre-existing, inert physical objects—instead of conjuring memories in the mind of the user, the mementos can conjure media in the user's physical environment.

Barry's Story Beads introduced a new kind of object that has memento-like qualities [Barbara Barry and Glorianna Davenport, "StoryBeads: a wearable for story construction and trade", MIT; Barry, B., "StoryBeads: a tool for distributed and mobile storytelling", MIT MS Thesis (2000)]. StoryBeads consists of small beads that can be strung together, each of which contain static EEPROM memory that is used to store images. A larger amulet bead can be connected with the image beads. This amulet includes an LCD screen and a simple interface. The interface permits the user to view the images stored on the beads. The beads can be traded among users and images can be transferred from bead to bead. A desktop GUI lets users transfer fresh images onto the beads themselves, as well as associate the images with metadata. StoryBeads seeks to establish a link between the physical beads and the narrative data they contain, as well as to explore how groups of beads can be viewed as whole narratives and be used to build new narratives. In this sense, Barry is exploring how physical objects can be associated with personal, social information, and how the physical objects might afford ways of understanding and manipulating that information. StoryBeads need not represent social relationships and they do not function to create communication channels between users.

Kikin-Gil has created a design prototype for a different bead system that supports social communication. Her "BuddyBeads" [Kikin-Gil, R., "BuddyBeads: techno-jewelry for non verbal communication within groups of teenage girls", Proceedings of the 7th international conference on Human computer interaction with mobile devices & services (2005), 375-376] are strung together as a bracelet. Each bead is associated with either a person or an agreed-upon message. A user can make the message beads of different members of the group vibrate by pressing on message and person beads on her bracelet. The beads as a whole act to link a network of people via dedicated physical objects, but do not purport to allow users to explore social links beyond those in their bracelet. It is not clear whether the BuddyBeads system was ever fully implemented.

As a class project at the MIT Media Lab, Norton, Liu and Laibowitz prototyped a system and coined the term "tangible social network" [Laibowitz, M., Norton, K., Liu, M., "Clique", MIT class project, 2004]. Their "Clique" system consisted of customizable, tradable dolls, each doll representing its creator. These dolls were to be exchanged among a group of friends. These dolls thus act as social objects, by both explicitly representing their creators, and by being gifts. The dolls would be placed on a special table that could take note of their relative positions and project this information onto a nearby wall or screen. Users could associate data with the dolls, as well as turn the doll's heads, perhaps to indicate their current feelings about the represented friends.

Camerer points out that gifts are a specific type of object that is likely to shape social relationships [Camerer, C., "Gifts as Economic Signals and Social Symbol", The American Journal of Sociology (1988), 94:180-214]. Gifts can be treated as signals of one's investment in another person. Put simply, a good gift is a physical symbol of a social relationship. Any gift contains information about the relationship between the giver and the receiver. First and foremost, each gift denotes the existence of a social link between two people. Second, the cost of the gift—how much time, money and knowledge are required to acquire and present it—represents the strength of that relationship.

Gifts can therefore sketch out the links of a social network. If this information can be captured, it can be used to document social networks that have more detail and greater consonance with a user's "reality-based" social network than current internet-based social network applications. Social networks can also be built up automatically, without forcing users to build their networks from scratch via clicks and email invitations, such as is currently required by internet-based social networks. These features would remove the barriers to entry and use that PC-based social networks entail, and would thus permit natural integration of social networking into a larger group of people's lives. Further, if this information could be captured with the implicit permission of the user, the privacy problems raised by data-mining methods for social network discovery would be avoided. Finally, a system that consists of communicative social objects—objects that provide a communication channel between the givers and receivers—would "close the loop" on the social networking application: instead of just allowing people to observe social network structures, a medium could be provided for social communication and display. Such a system would provide a complete social network application: a medium for exploring and building social networks.

SUMMARY

A tangible social network employs reciprocally exchanged interactive physical objects that automatically establish and provide direct communication channels between the people exchanging them. The system preferably also captures and displays social link information derived from the interactions of the objects with each other and with their environment. The system leverages gift-giving practices, presenting users with interactive physical objects that they exchange with one another. These objects automatically form always-on communication channels between givers and receivers. As a user collects more and more of these objects, he or she begins to acquire a dynamic, physical representation of, and an interface to, her social network. The interactions of the community of users implicitly represent the structure of the social network. These data can be accessed with an optional GUI application, allowing users to explore and interact with their social network. A prototype, the "Connectibles" system, was implemented at the MIT Media Lab, where it was the subject of three user studies.

In one aspect of the invention, a tangible social network system comprises at least two interactive physical objects, each interactive physical object being adapted for communicatively linking with at least one other interactive physical object, at least one tangible social network visualization application for providing a visual representation of the tangible social network of a user, and at least one object communication frame capable of displaying at least one interactive physical object. In another aspect, a tangible social network comprises at least one tangible social network management system for receiving information about the composition of a tangible social network of at least one user, wherein the tangible social network of the user comprises at least one set of communicatively linked interactive physical objects, for sending user-generated interactive physical object commands to at least one of the communicatively linked interactive physical objects, for deriving a representation of the tangible social network of the user, for providing the representation of the tangible social network of the user to the user in a visual form, and for accepting and acting on user commands and data related to management of the tangible social network of the user.

In one aspect, an interactive physical object comprises a housing, a controller for forming a communicatively linked relationship with at least a second interactive physical object, for receiving and processing commands and data received from the linked interactive physical object, and for generating at least one response command in response to the received commands and data, and at least one response subsystem adapted for displaying at least one visual or audio response to a response command received from the controller. The interactive physical object may also receive and process commands and data received from at least one tangible social network visualization application and generate at least one response command in response to the received visualization application commands and data.

In another aspect, an object communication frame comprises a housing adapted to receive installation of at least one interactive physical object, a communications subsystem for receiving and managing communications with the installed interactive physical objects and with interactive physical objects communicatively linked with the installed interactive physical objects, a controller for receiving and processing commands and data received from the communications subsystem and generating at least one response command or data in response to the received commands and data, and an interactive physical object power subsystem adapted for providing power to installed interactive physical objects. The object communication frame may further receive and process commands and data received from at least one tangible social network visualization application and generate at least one response command in response to the received visualization application commands and data.

In yet another aspect, a tangible social network visualization application comprises a communications subsystem for receiving information about the composition of a tangible social network of a user, the tangible social network comprising at least one set of communicatively linked interactive physical objects, a tangible social network visualization subsystem for deriving a representation of the tangible social network of the user from the information received by the communications subsystem, and a graphical user interface adapted for providing the representation of the tangible social network to the user in a visual form.

BRIEF DESCRIPTION OF THE DRAWINGS

Other aspects, advantages and novel features of the invention will become more apparent from the following detailed description of the invention when considered in conjunction with the accompanying drawings wherein.

DETAILED DESCRIPTION

Figure 1:
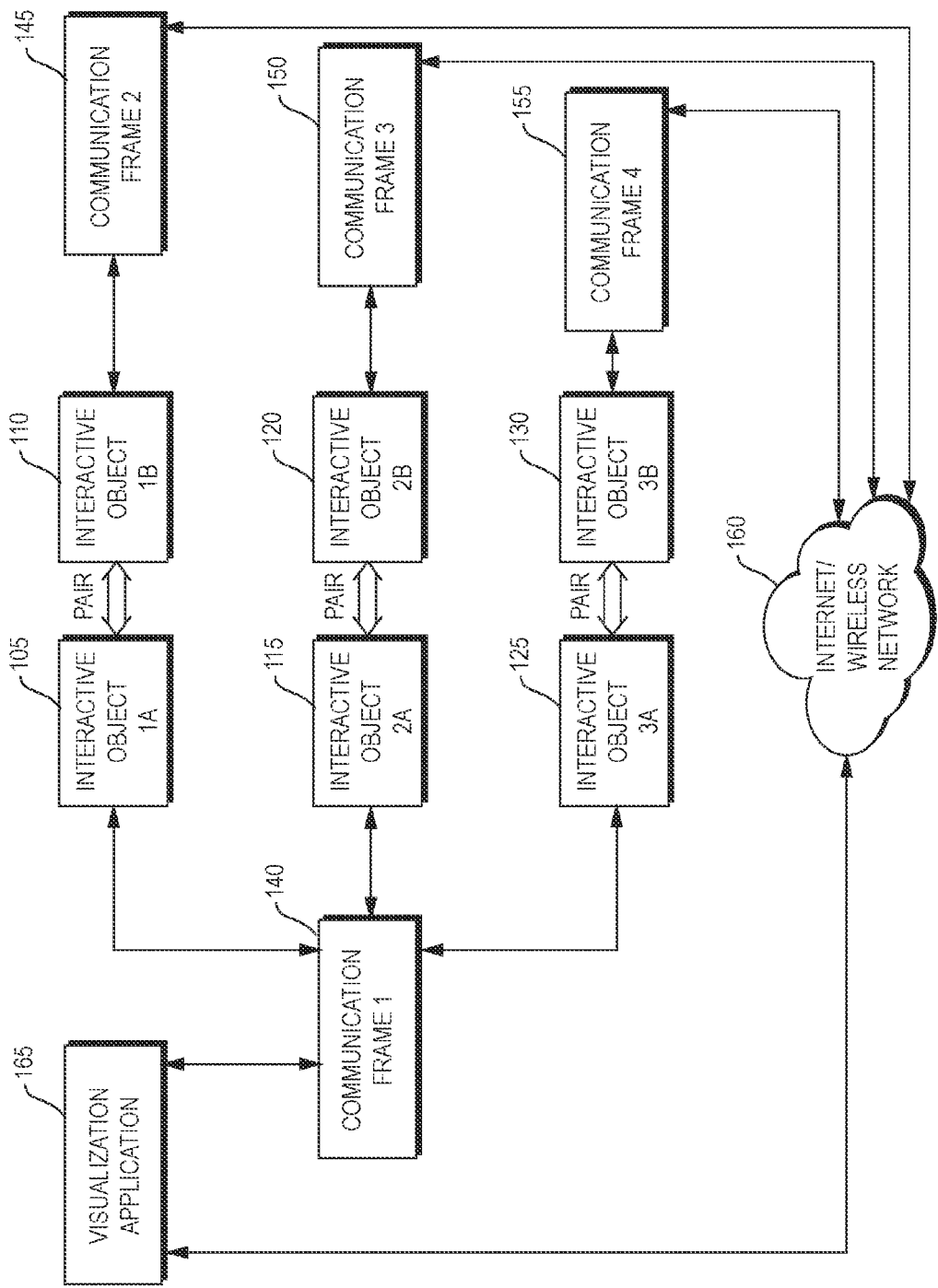
FIG. 1 is block diagram of an embodiment of a tangible social network according to the present invention.

A social network application rooted in physical objects and real world social behavior leverages natural gift-giving practices, presenting users with customizable, interactive physical objects that they exchange with one another. Reciprocally exchanged interactive physical objects automatically form always-on communication channels between givers and receivers. Interactive physical objects can be of any interaction modality: visual, tactile, aural, or combinations thereof. For example, for two simple touch-sensitive interactive physical objects in a prototype implementation, when one user touches her interactive physical object, the other user's interactive physical object glows, and vice-versa. As a user collects interactive physical objects from her friends, she builds up a dynamic, physical representation of, and interface to, her social network. The interactions of a community of users implicitly represent the structure of the social network by showing, for example, who has exchanged interactive physical objects with whom and how often they communicate with their interactive physical objects. These data may be visualized with a GUI application, allowing users to explore and interact with their social network. The network architecture of the present invention instantiates a fully tangible, TCP/IP framework, allowing synchronous communication across large distances among many users. It is designed to support large numbers of interactive objects without requiring special initialization rituals on the part of the users and it also allows highly simplified development of remote awareness applications.

Using the system of the invention, users acquire interactive physical objects that represent people in their social network. In a preferred embodiment, an interactive physical object is given to the user by the person it represents. These objects are then used to communicate with the people represented. When users exchange objects, the object-pairs form a communication channel. When a user gives another a physical object without receiving one in return, the giver can send messages to the physical object using a standard device, such as a computer or phone. The communication channels can take any form, including audio, visual, or tactile. The network that supports the communication is agnostic as to the interaction type. As the user collects interactive physical objects that represent their social network, the physical arrangements of these objects as well as the communication habits of the user are captured by the system. The structure of the social network, as implicitly represented by user interactions, can be accessed with a GUI application, either web-based or installed locally on a computer, thereby allowing users to explore and interact with their social network in the same way currently facilitated by web-based social networks. However, in the preferred embodiment, the primary mode of interaction is not via a computer, but rather is directly through the interactive physical objects themselves.

As used herein, the following terms expressly include, but are not to be limited to:

The term "social network" means a social network software/firmware application when it is clear from context that the term is being used to refer to an application (such as MySpace) rather than to a person's set of relationships.

The terms "PC-based social network" or "virtual social network" mean software or firmware applications that are accessed via a personal computer graphical user interface, and which are typically web-based.

The term "tangible social network" means an application comprising interactive physical objects that allow users to create, maintain, and display social connections. In particular, a tangible social network is a system that comprises interactive physical objects, augments those objects to enable direct channels between the people represented by them, and digitally captures and displays social link information inherent in those objects. A tangible social network is thus a collection of objects that, in aggregate, map out the social network of all of the people with whom they are associated.

The term "interactive physical object" means a small physical token that can establish a communication channel between two people and is intended to be manipulated by one of the people in order to communicate with the second person.

The terms "linked interactive physical objects" and "paired interactive physical objects" mean two or more interactive physical objects that have established a communication channel between themselves.

The term "object communication frame" means a device that provides power and communication to interactive physical objects and which typically provides a framework within which the objects may be arranged by a user.

The term "visualization application" means an application that supports the specifics of a tangible social network. The visualization application is preferably employed to directly reflect the physical arrangement of the users' interactive physical objects and typically can also be used to interact with the partner objects.

The term "Connectibles", with an upper case "C", refers to a particular prototype implementation of a tangible social network as described herein, including the interactive physical objects, networking infrastructure, and visual application. In particular, Connectibles consists of a network of reciprocally exchanged interactive physical objects, wherein each pair of reciprocally exchanged interactive physical objects implicitly represents a social relationship, and wherein each pair forms a communication channel between the two exchangers.

The term "connectibles", with a lower case "c", refers to a particular prototype implementation of a set of interactive physical objects, as described herein.

The term "friendframe" refers to a particular prototype implementation of an object communication frame, as described herein.

A basic tangible social networking system according to the invention employs interactive physical objects and an optional visualization application that allows users to explore their own and their friends' object collections and arrangements. FIG. 1 is block diagram of a preferred embodiment of a tangible social network that employs object communication frames, according to one aspect of the present invention. In FIG. 1, interactive physical objects 105, 110, interactive physical objects 115, 120, and interactive physical objects 125, 130 are communicatively linked. Interactive physical objects 105, 115, 125 are installed in, or are otherwise in communication with, object communication frame 140, interactive physical object 110 is installed in, or is otherwise in communication with, object communication frame 145, interactive physical object 120 is installed in, or is otherwise in communication with, object communication frame 150, and interactive physical object 130 is installed in, or is otherwise in communication with, object communication frame 155. Object communication frame 140 is further in communication with visualization application 165, which communicates via internet/wireless network 160 with object communication frames 145, 150, 155 and through them with interactive physical objects 110, 120, 130. While visualization application 165 is part of this preferred embodiment, it will be clear to one of ordinary skill in the art that alternative systems embodying the functionality and concepts of the present invention may be implemented without the use of a visualization system and that such systems are within the scope of the invention.

Figure 2:
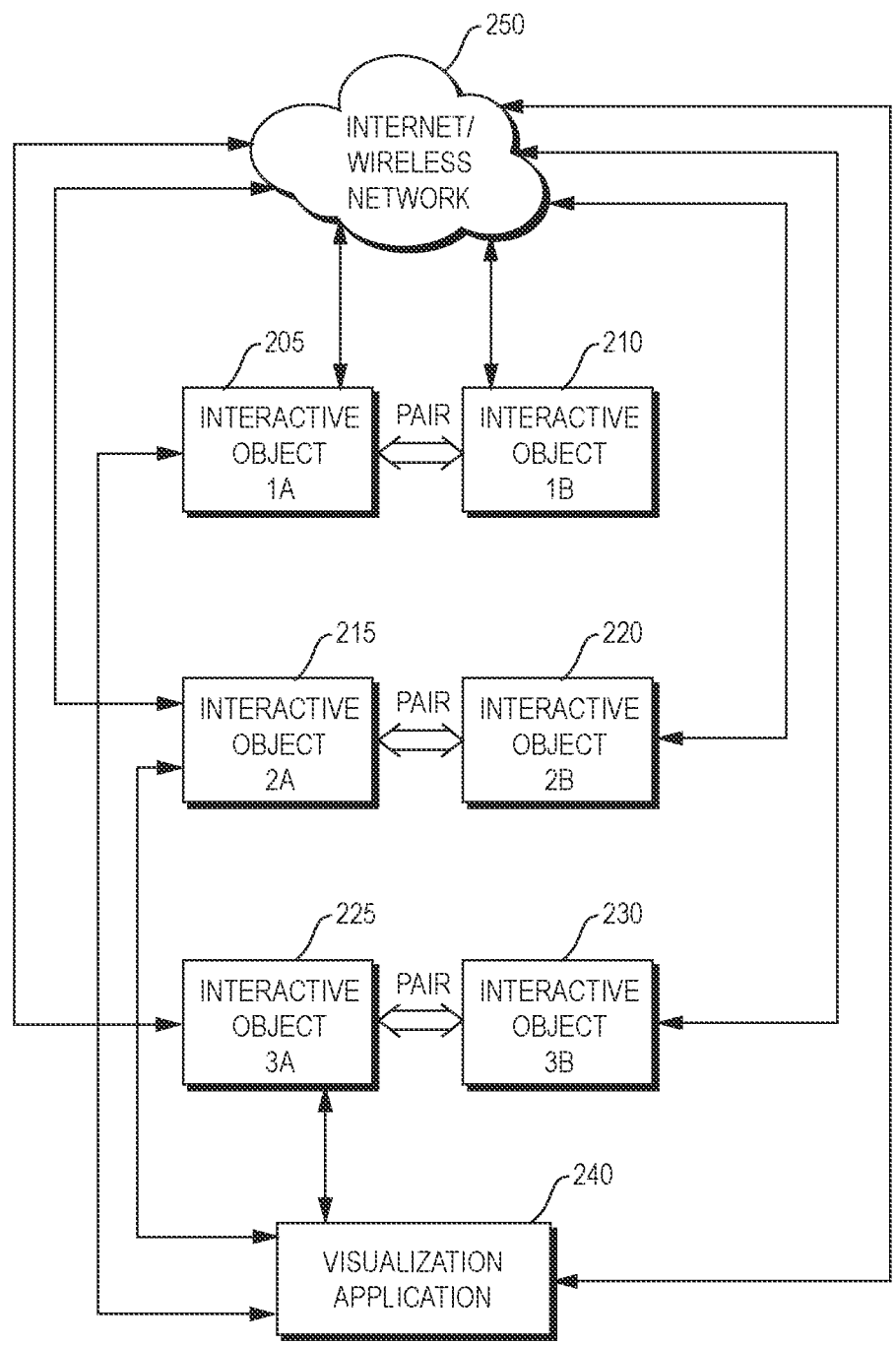
FIG. 2 is a block diagram of an alternative embodiment of a tangible social network according to the present invention.

FIG. 2 is a block diagram of an alternative preferred embodiment of a tangible social network that does not employ object communication frames. In FIG. 2, interactive physical objects 205, 210, interactive physical objects 215, 220, and interactive physical objects 225, 230 are communicatively linked. Interactive physical objects 205, 215, 225 are in communication with visualization application 240, which communicates via internet/wireless network 250 with interactive physical objects 210, 220, 230. Interactive physical objects 205, 215, 225 are also in direct communication with internet/wireless network 250, through which interactive physical objects 205, 215, 225 may communicate directly with interactive physical objects 210, 220, 230. While visualization system 240 is part of this alternative preferred embodiment, it will be clear to one of ordinary skill in the art that alternative systems embodying the functionality and concepts of the present invention may be implemented without the use of a visualization application and that such systems are within the scope of the invention.

Figure 3:
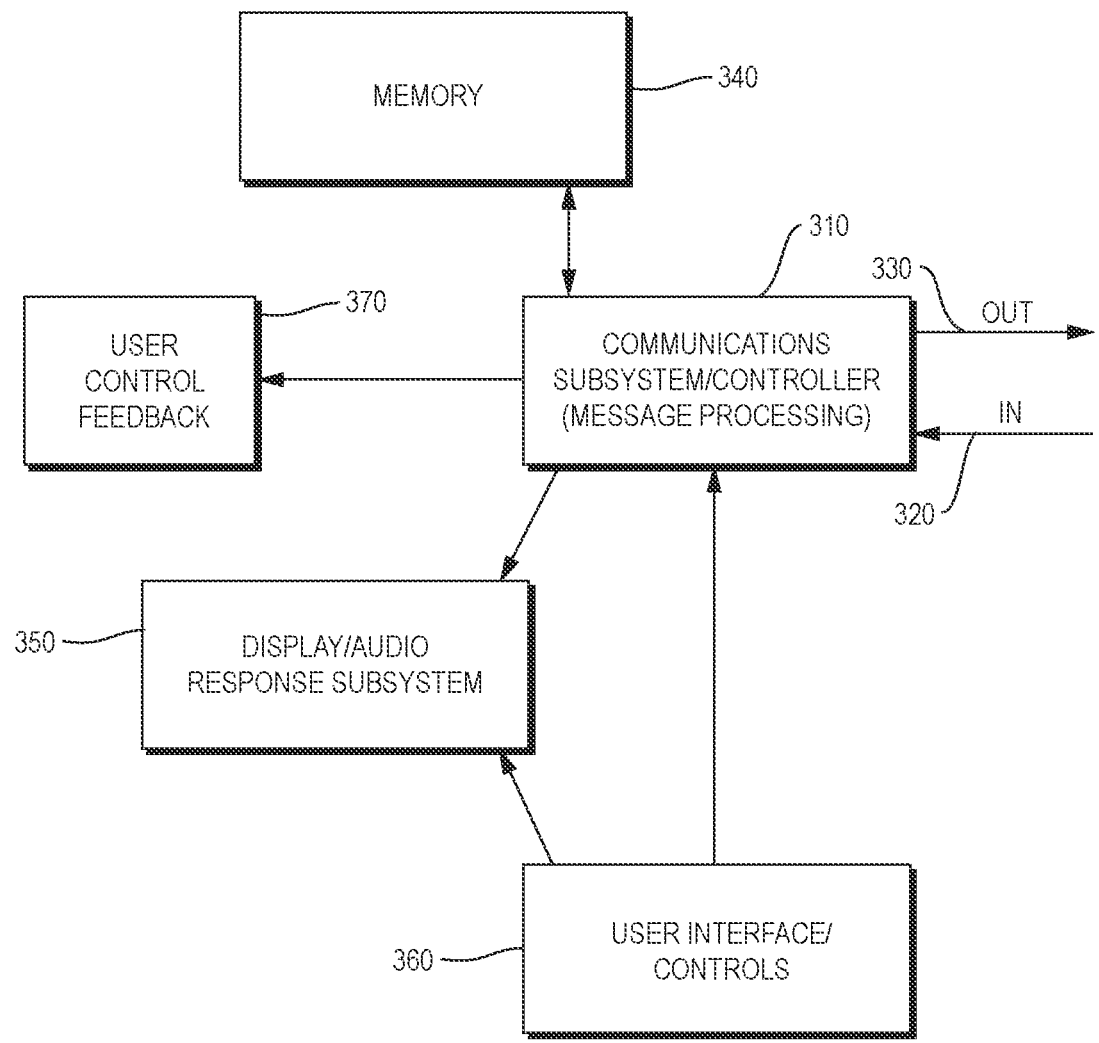
FIG. 3 is a block diagram of an embodiment of an interactive physical object according to one aspect of the present invention.

Interactive physical objects can be of any interaction modality: visual, tactile, aural, or a combination thereof. These different kinds of objects can support a different type, or types, of interactions. FIG. 3 is a block diagram of an embodiment of a generalized interactive physical object according to this aspect of the present invention. In FIG. 3, controller 310 is responsible for message processing, forming the communicatively linked relationship with another interactive physical object, receiving 320 and processing commands and data received from the linked interactive physical object and the visualization application, if used, and sending 330 commands and data back. In a preferred embodiment, the tangible interface object has memory 340. Display/audio response system responds to commands from controller 310 by displaying at least one visual or audio response and may also respond to commands from optional user interface controls 360. User control feedback 370 may also optionally be supplied, as may an on-board power source.

In a preferred embodiment, an interactive physical object communicates only with a single exchanged partner. As a general principle, if an object were to habitually broadcast to multiple others, then the relationship between object and giver might be eroded. However, it is certainly possible for the system to provide the capability for an object to be linked to, and interact with, more than a single other interactive physical object, and this capability may be desirable in certain applications. For example, a group of interactive physical objects might be linked in order to permit communication between the members of a family or a particular social or interest group. As it is easily within the ability of one of skill in the art to implement such functionality, this capability is therefore considered to be within the scope of the present invention.

Normally, interactive physical objects will only be exchanged with an object of the same type, but it is clearly possible to permit the exchange of different types of objects since the system is capable of supporting many different types of interactive objects. In certain circumstances, an exchange of disparate interactive objects may be desirable, and it is well within the abilities of one of ordinary skill in the art to implement this functionality by creating interaction mappings between disparate types of objects. Disparate object exchanges, while likely to be uncommon, are therefore considered to be within the scope of the invention.

In a preferred embodiment, users do not have to engage in any special behaviors in order to reciprocally exchange interactive physical objects. Reciprocally exchanged interactive physical objects do not need to be touched together or connected in any way in order to be communicatively linked. This pairing is seamless, as the system takes care of this behind the scenes. A user simply needs to give one and receive one in exchange. In fact, interactive physical objects can be exchanged asynchronously. Reciprocally exchanged interactive physical objects preferably may remain paired "for life," even if they are removed from the system during rearrangement or otherwise lose power. In other words, the communication channel between a pair of reciprocally exchanged interactive physical objects is always-on and unbreakable. While it is clear to one of skill in the art that pairings may be made to be erasable or otherwise reassignable, as a general principle the symbolic value of the objects as indicators of a particular person would consequently suffer. However, it is within the ability of one of ordinary skill in the art to provide this functionality, and it is therefore considered to be within the scope of the present invention.

Interactive physical objects according to the present invention can provide a variety of features and options, such as high or low bandwidth interactions and evanescent or persistent messages. High bandwidth interactions allow users to send rich messages, such as pictures or music. Low bandwidth messages are more compact; for example, but not limited to, such messages might cause a partner object to simply light up. Evanescent messages appear and fade away, while persistent messages permanently change the state of an interactive physical object until another message is received. Self-contained messages can be initiated using just the affordances and display on the interactive objects, while PC-dependent messages require the use of a computer to send a message. For example, in the prototype system, sending a picture to a picture connectible required a computer. However, it is clear to one of skill in the art that a picture connectible might be designed to directly accept images from another device, such as, but not limited to, a USP stick or flash card.

Figure 4:
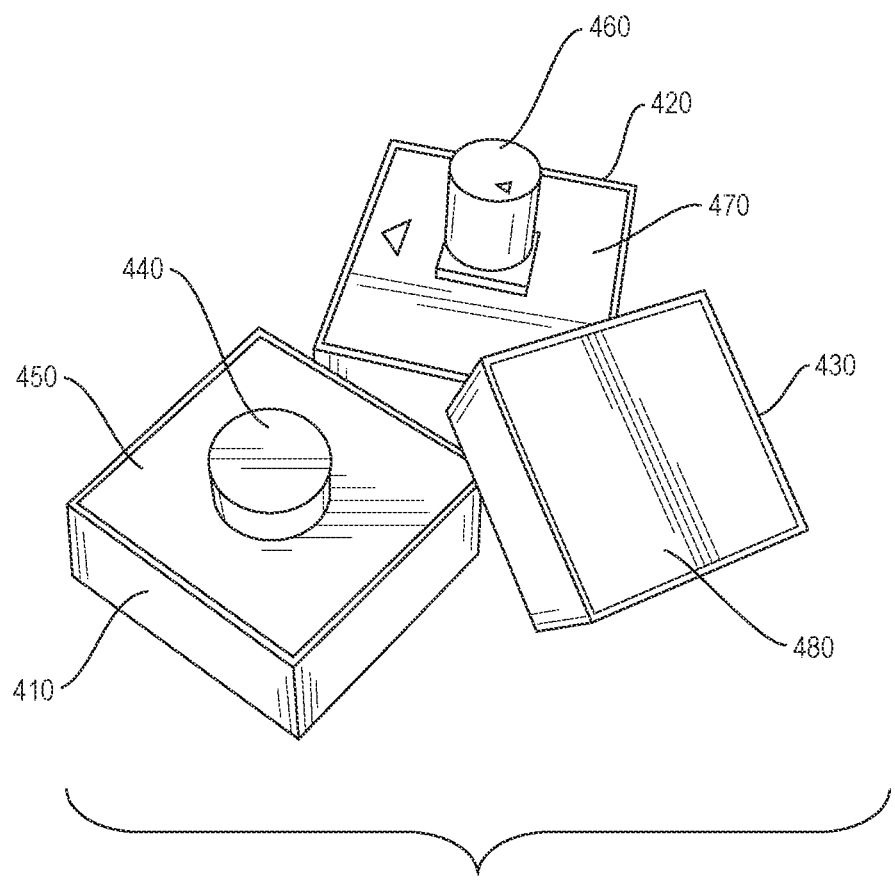
FIG. 4 depicts three types of interactive physical objects implemented as part of a prototype embodiment of a tangible social network according to the present invention.

FIG. 4 depicts three types of interactive physical objects implemented as part of the prototype "Connectibles" embodiment of a tangible social network according to the present invention, button connectible 410, knob connectible 420, and picture connectible 430. Button connectible 410, as implemented in the prototype, comprises large button 440 and a ring of LEDs under frosted acrylic cover 450. Pushing button 440 causes its partner connectible to slowly light up, then fade out. An optional bottom LED is reserved for feedback to the sender: it glows when the user pushes button 440, indicating that the system did indeed capture and send the message. Button messages are thus low bandwidth, evanescent, and self-contained.

Knob connectible 420, as implemented in the "Connectibles" prototype, have twistable knob 460 and a ring of LEDs under frosted acrylic cover 470. The lights on knob connectible 420 reflect how far its partner's knob is turned. An optional bottom LED is used as feedback, as in button connectible 410, in order to indicate to the sender that a message has been sent. Each knob 460 has a pointer painted on it that indicates what position it is currently in, and thus the state of the partnered connectible's ring of lights. Knob messages are thus low-bandwidth, persistent, and self-contained.

In the prototype "Connectibles" embodiment, the button and knob connectibles each include an Atmel AVR Atmega88 TQFP microcontroller. The physical pushbutton on the button connectible is wired through a passive debounce to an interrupt pin on the AVR. The knob on the knob connectible is a potentiometer wired through a simple resistive divider into an ADC pin on the microcontroller. The button and knob connectibles control their LEDs independently with dedicated GPIO pins. The remaining components on these connectibles are passives, such as decoupling capacitors and pull-up resistors. These connectibles can support 20 MHz ceramic resonators, but in this implementation they were run at 8 MHz.

The button and knob connectibles were built with the same 1.5" square two-sided PCB. The firmware code was written in C using AVRStudio4.

Figure 5A:
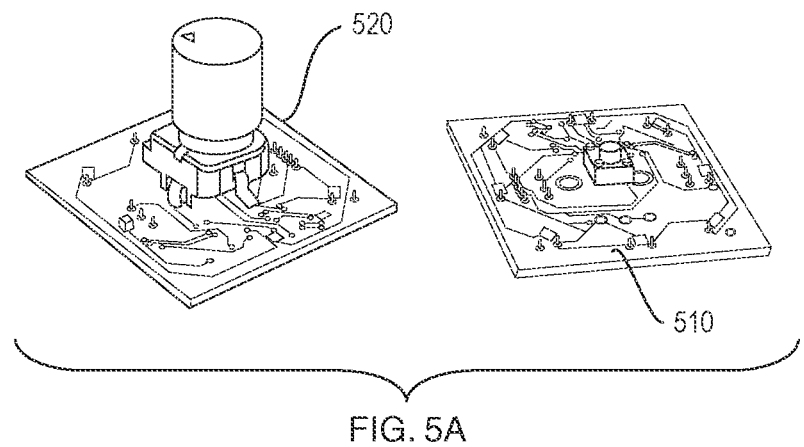
FIGS. 5A and 5B depict the populated electronic circuit boards of button and knob interactive physical objects implemented as part of a prototype embodiment of a tangible social network, according to the present invention.
Figure 5B:
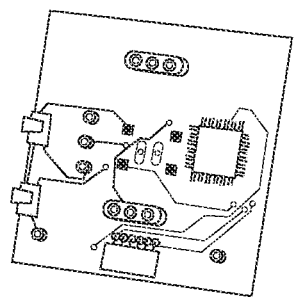
Figure 5C:
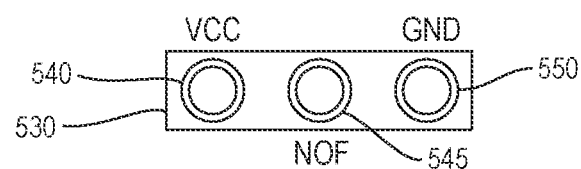
FIG. 5C is a schematic of the six pin interface used to connect the interactive physical objects of FIGS. 5A and 5B to the object communication frame of a prototype embodiment of a tangible social network according to the present invention.
Figure 5C:
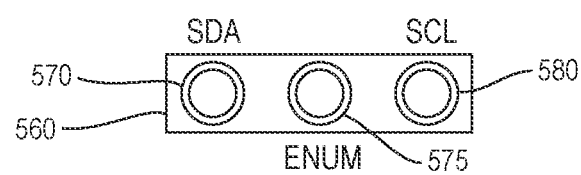

FIGS. 5A and 5B depict the populated electronic circuit boards of button 410 and knob 420 interactive physical objects of FIG. 4. FIG. 5A depicts the tops of the button 5410 and knob 520 connectibles. FIG. 5B, depicts the bottom of either a knob or button connectible. FIG. 5C is a schematic of the six pin interface used to connect the interactive physical objects of FIGS. 5A and 5B to the object communication frame of the prototype "Connectibles" embodiment.

Picture connectible 430 (FIG. 4) is the most complex connectible implemented for the prototype "Connectibles" embodiment. It comprises a full color OLED display 480, with four buttons hidden under each corner. A user can press these buttons by pushing on the corner of the display. In the prototype "Connectibles" embodiment, a user can send preset animation messages to their friend's partner connectibles using the top two buttons: the left button sends a series of flashing "Hi!" graphics, which last about five seconds. The right button sends a series of animated hearts, which also lasts about five seconds. Users can also send each other pictures using the visualization application. The pictures appear on the partner connectible and remain there until changed by the sender. Each picture connectible stores the sent images, with space for approximately one hundred pictures. Using the bottom buttons, the user can browse through all the pictures sent to that connectible; the left button browses backward, the right forward. Picture connectible messages are thus high bandwidth, both evanescent (the animation messages) and persistent (the image messages), and both self-contained and PC-dependent (again due to the animation and image messages, respectively). It will be clear to one of skill in the art that, with sufficient memory, picture connectibles are suited for playing video clips, with or without looping.

Picture connectible 430 is necessarily more sophisticated than the button 410 and knob 420 connectibles. In the prototype embodiment, it contains an Atmega644 AVR TQFP microcontroller. Like the button and knob connectibles, picture connectible 430 can be run at 20 MHz, but was run at 8 MHz for stability reasons. The picture display is a NEWTEC 128×128 8/16 bit RGB color OLED. The AVR is wired to the display via a parallel connection and the OLED is connected to the board via a 30-pin flex connector. The four buttons on the picture connectible were debounced and wired to interrupt pins on the AVR. The AVR uses two GPIO outputs to control its two LEDs. This PCB also includes a 16 Mbit Atmel AT45 DB161D external flash chip (SOIC package), and all images are stored as bitmaps on this flash chip. The AVR communicates via SPI to the flash chip. The chip can store approximately 100 raw bitmaps before filling up. A switching voltage boost circuit built around a TPS61041 IC provides a stable 12V supply required by the OLED. The PCB was two-sided and 1.4125" square, exactly the size of the OLED. The firmware code was written in C using AVRStudio4.

Another type of connectible developed for the "Connectibles" prototype is the "glint" connectible. When a user waves his wand over a "glint", its partner glows. "Glint" connectibles use LEDs as light sensors in order to support this interaction.

In the prototype "Connectibles" embodiment, all connectibles require external power; they do not operate without an object communication frame. If removed from the friendFrame, they immediately turn off. This makes them substantially simpler, cheaper, and smaller than battery powered devices. It will be clear to one of skill in the art, however, that interactive physical objects according to the present invention may advantageously have their own onboard power source including, but not limited to, one or more battery, solar, or wireless RF power supplies.

All prototype connectibles included reset buttons and UART serial outputs for debugging purposes. The connectible printed circuit boards (PCBs) were all placed in sandblasted acrylic cases. Connectibles connected to the friendFrame via the six pin interface shown in FIG. 5C. All PCBs, both connectible and friendFrame, were manufactured by Advanced Circuits. They were designed and populated by hand in house. All microcontroller code was written in C using AVR Studio 4 with an STK500 programmer. Pascal Stang's Procyon AVRlib was used extensively.

In the prototype, all connectibles were the same size-1.5" square and about ½" tall. While this eliminated the mapping of importance to physical size, it addressed a problem that subjects of one experiment had: the bigger connectibles had more connection points than the smaller ones, even though the people represented by them were not necessarily more "socially connected" than those represented by smaller connectibles. Reducing all connectibles to the same size in the prototype eliminated this issue as a variable in the user study. However, it will be clear to one of skill in the art that interactive physical objects need not all be of the same size or shape, in the same way that they need not all have the same capabilities and features.

It will further be clear to one of ordinary skill in the art that the system is trivially extensible. Importantly, the system supports interactions of any modality or media type, including but not limited to, audio, video, and tactile interactions. One trivial addition to interactive objects that play audio and video are "play" and "stop" buttons, allowing the receiving user to determine when to play the received media. The default mode could alternatively be to loop such media. Other possibilities include a microphone/speaker object, whereby, for example, a user may leave specific audio messages for a friend and that friend's paired object blinks like an answering machine in order to indicate that a message is present. A button press then plays the message through the speaker.

Another option is objects that provide musical instrument sounds, such as, for example but not limited to, a mini drum machine with a few buttons and a speaker. Pressing the buttons synchronously triggers samples on both paired objects. In this way, two people can communicate over a distance through music.

Yet another option is a shared touchscreen object. The screen displays the scribbles of both friends, acting as a shared scratch space. This object might also support text messages, in the manner of a tangible version of Twitter, a popular social network application that allows users to broadcast very short text messages (140 characters or less) to their friends via both a web and a mobile device interface.

One low bandwidth option is a modification of the button connectible. This connectible is a double-throw or toggle style button. If the button is pushed, it stays down, keeping its partner lit. Another low bandwidth option is an object with a component that physically moves. These objects are outfitted with small motors or servos. One prototype developed was a pair of connectibles with small wooden hands attached to motors. When a button on one connectible was pressed, it would cause its partner's hand to wave for a few seconds.

It will be clear to one of ordinary skill in the art that the possibilities for interactive physical object types are limitless. For example, long-term subjects of one of the user studies indicated a desire to know whether anyone was on the other end when they sent a message with a connectible. One subject only wanted connectibles that were all "passive," in that they did not require the user's direct manipulation. Instead, they would sense the environment in different ways, sending messages that indicated ambient noise, light, and so on. The long-term subjects "modded" a button connectible to work as an ambient connectible. They affixed a solenoid right on top of the button. These users taped a small, force-sensitive pad to a chair, and wired the pad to the solenoid. The solenoid was thus triggered every time the user changed his posture in his chair, pushing the button and sending a message. Obviously, this is not exactly what a "typical user" might do, but it indicates that ambient connectibles, or built-in ambient sensing in the object connection frame, would be an advantageous option. It also indicates the flexibility of the system, permitting users to adapt basic interactive physical objects to meet specific individual objectives.

It is also possible to provide the ability for users to build their own interactive objects. Because the system's network architecture is independent of the object input/output behaviors, a simple interactive physical object "plinth" can be provided. This base unit breaks out four pins—power, ground, input and output. A user may attach his own interactive unit to the plinth. For example, putting a high voltage on the input pin would trigger a message; this message would bring the output pin on the paired connectible high for a few seconds. Any arbitrary switching system could thus be built on top of the plinth. For example, the waving hand connectible mentioned previously was built in this way. Its designer had no knowledge of the Connectibles network protocol, nor did he need to. All he had to build was a very simple on/off electric switch and stick it on top of a plinth style connectible.

In the prototype "Connectibles" embodiment, the connectibles indicated that messages had been sent with a glowing LED. It will be clear to one of skill in the art that more, or different, feedback may also be provided. The feedback can be of a different modality than the message, or can appear somewhere clearly separate from the output LEDs. The LED feedback may alternatively indicate "message arrived," instead of "message sent." Additionally, feedback may be provided about the state of other people's connectibles. The visualization application can also reflect the state of the knobs and picture objects as well, providing a tight coupling between the physical state of the connectibles and their virtual representations.

In the preferred embodiment, the interactive physical objects support some degree of physical customizability. It appears that customization creates a stronger, more specific association between connectible and person. The knobs and buttons in the prototype embodiment included paper faceplates that could be attached and decorated, while the picture connectibles could be customized on-the-fly by sending new pictures to them. The design included removable paper faceplates for the knob and button connectibles. Users could decorate the connectibles in any way: for example, they could include drawings, or instructions on how to interpret the connectibles messages.

Figure 6A:
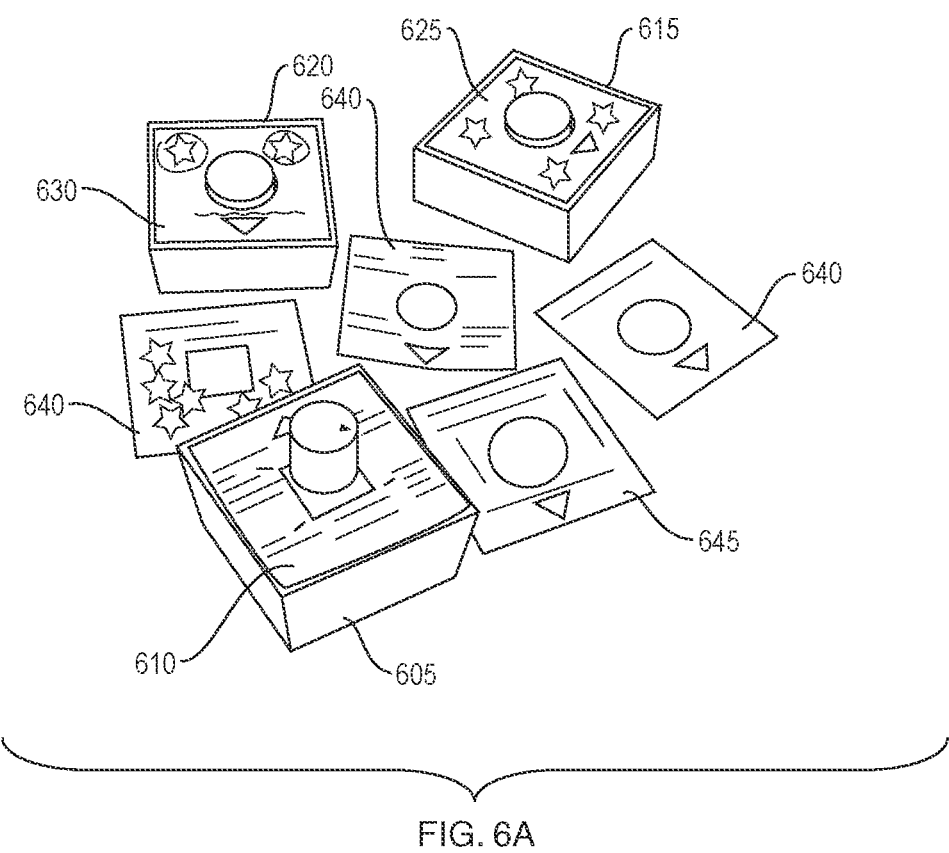
FIGS. 6A and 6B depict user-embellished interactive physical objects from a study of a prototype embodiment of a tangible social network, according to the present invention.
Figure 6B:
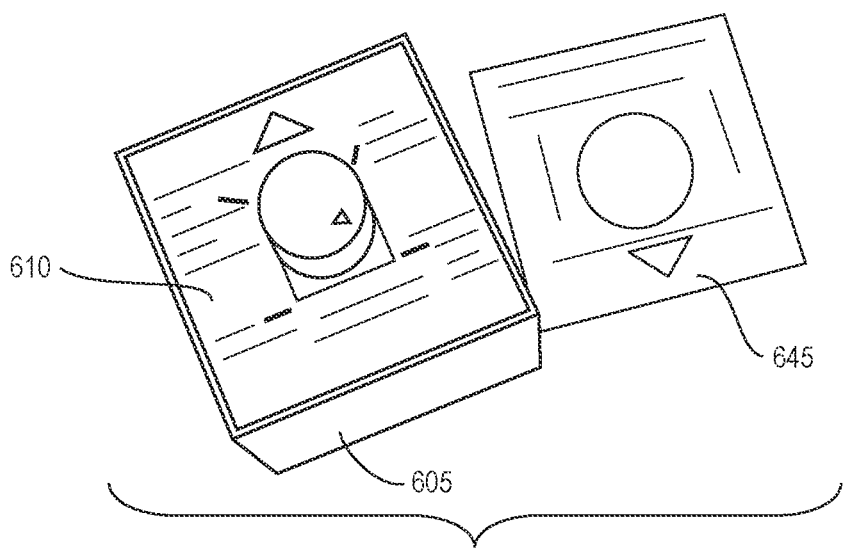

FIGS. 6A and 6B depict user-embellished connectibles from a study of the prototype embodiment. In FIG. 6A, knob connectible 605 has been decorated by faceplate 610 and button connectibles 610, 620 have been decorated with faceplates 625, 630. Alternate personalized faceplates 640,645 are also shown. FIG. 6B is a closeup of button connectible 605 and faceplates 610, 645. These faceplates appear to enrich the exchange and interaction semantics by increasing the signal cost and symbolic value associated with a connectible.

In a preferred embodiment, the system includes an object communication frame. In the prototype "Connectibles" embodiment, the object communication frame, known as the "friendFrame", simplified a number of technological issues regarding the networking protocol. The object communication frame provides power and communication behind the scenes, eliminating the special units required by other designs. While the object communication frame could limit the number of interactive physical objects a user could acquire, it will be clear to one of skill in the art that the object communication frame may be designed so that it may be easily extended with one or more pluggable add-on frames. One advantage of the object communication frame is that it allows users to create arrangements with disconnected groups, which is not possible if all of the objects must physically touch. In a preferred embodiment, the object communication frame provides both power and a connection to the Internet or wireless network.

Figure 7:
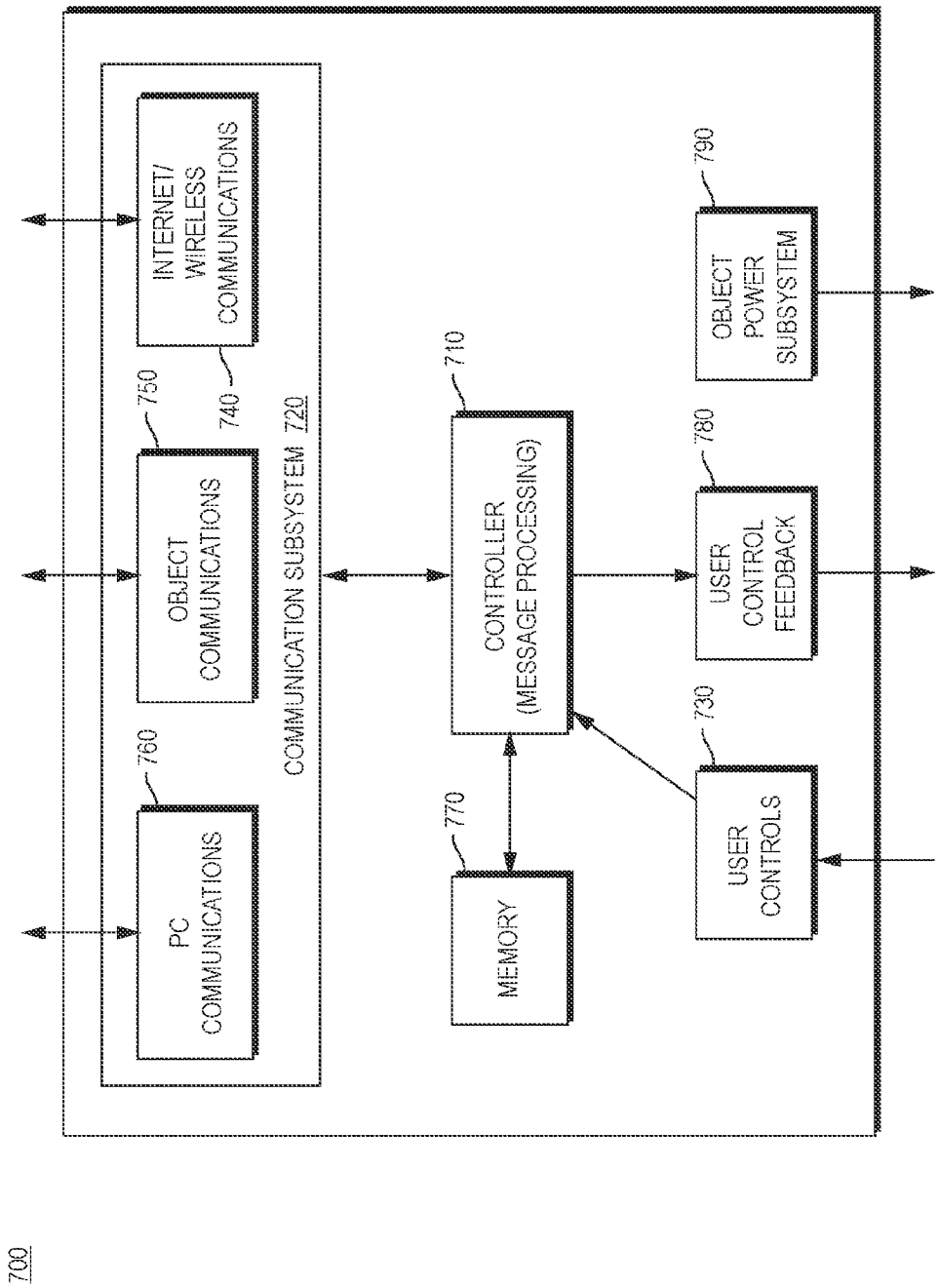
FIG. 7 is a block diagram of an embodiment of an object communication frame according to one aspect of the present invention.

FIG. 7 is a block diagram of an embodiment of an object communication frame according to one aspect of the present invention. In FIG. 7, object communication frame 700 comprises controller 710 which receives and processes commands and data received from communications subsystem 720 and, optionally, from optional user controls 730. Communications subsystem 720 receives and manages communications with the internet or wireless network 740, installed interactive physical objects 750, and, optionally, with an associated computing device 760. Also optionally present are memory 770 and user control feedback system 780. Interactive physical object power subsystem 790 provides power to installed interactive physical objects.

Figure 8:
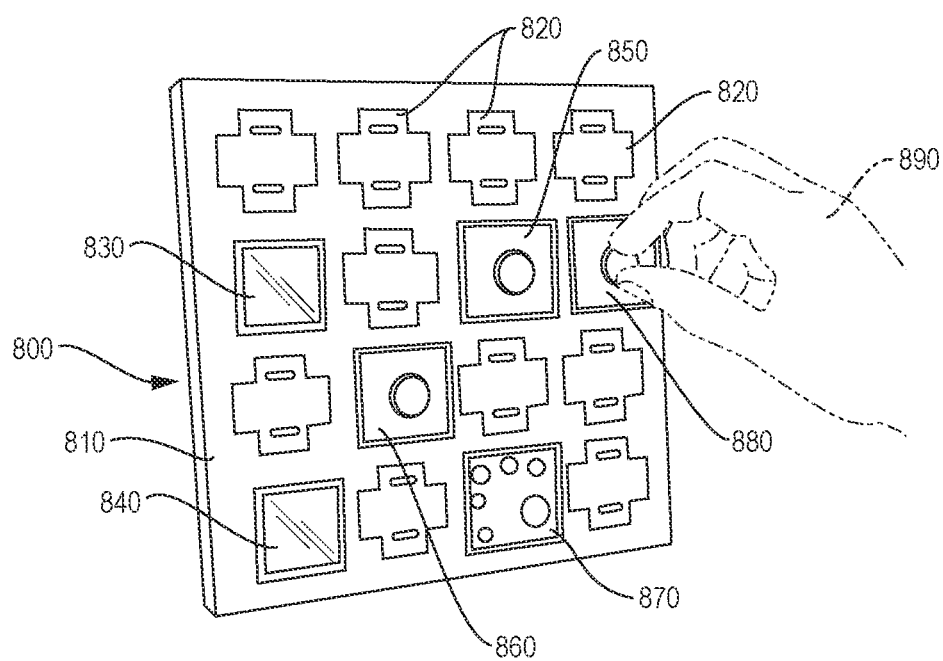
FIG. 8 depicts interactive physical objects connected into a prototype embodiment of an object communication frame, according to one aspect of the present invention.

FIG. 8 depicts prototype interactive physical objects arranged in, and connected into, a prototype embodiment of an object communication frame. In FIG. 8, object communication frame 800 comprises housing 810 and empty interactive physical object connection ports 820. Frame 800 is currently hosting installed picture connectibles 830, 840, button connectibles 850, 860, and knob connectibles 870, 880. Knob connectible 880 is being adjusted by a user 890.

Reciprocally exchanged interactive physical objects automatically form always-on communication channels between givers and receivers. Users do not need to engage in any special or contrived behaviors in order to pair exchanged objects. Once a pair of exchanged objects are plugged in to their respective object connection frames, they automatically find one another and create an persistent communication channel. This channel is not broken, even if the objects or frames are powered off or moved. This seamless exchange is supported by a network and addressing protocol technology developed specifically for this system.

In the "Connectibles" prototype embodiment, the friendFrame includes an Atmel Atmega644 AVR microcontroller, a few general purpose RC-debounced buttons, and four output LEDs. The friendFrame includes a low-dropout linear voltage regulator and accepted a consumer wall wart. The voltage regulator provides a stable 3.3V supply and could source up to 4 A. The friendFrame also includes an FTDI FT232R IC, which translates a serial UART connection from the AVR to a PC USB. The firmware code was written in C using AVRStudio4.

Each friendFrame cell provides a six pin interface (FIG. 5C) to the friendFrame bus, in two rows of three. These two rows are slightly offset so that a connectible cannot be plugged in upside down. Top row 530, from left to right, provides pins VCC 540, NOF 545 (a no function pin), and GND 550. Bottom row 560, from left to right, provides SDA 570, ENUM 575, and SCL 580. SDA 570 and SCL 580 provide access to an I²C (Inter-integrated-circuit), also known as a TWI (Two Wire Interface) bus, comprising two lines, SDA (data) and SCL (clock). Using two 3:8 digital encoders, the friendFrame AVR has separate ENUM output connection 575 to each cell. ENUM pin 575 is used by the friendFrame to discover if a connectible is present in a cell. Top row 530 provides power 540 (3.3V VCC) and ground 550 (GND), allowing the connectible to turn on. Middle pin NOF 545 was unconnected, and was included only for structure and simplicity. While the prototype structure is disclosed, it will be clear to one of the skill in art that there are many alternative configurations, all of which would be suitable and easily implementable by one of ordinary skill in the art of the invention.

In the user studies of the prototype "Connectibles" embodiment, the friendFrame triggered some metaphorical associations with photograph frames. Since people often think of photographs as mementos, and already know how to keep and display their important photos, the friendFrame provides a natural place to store and display connectibles. If the system consists only of picture connectibles, such an association would likely be strongest.

The prototype friendFrame also demonstrated that arrangement of the interactive physical objects is a process. The preferred embodiment includes a small button that, when pushed, puts the object communication frame into a "ready to arrange" state. A signal, such as the small bar of green LEDs under a frosted plastic cover that lights up on the bottom of the prototype friendFrame, may be provided to indicate this state to the user. In this state, users may freely add, move, or remove interactive physical objects. When done, the user engages the button again. In a preferred embodiment, the system logs only the final state, adding some measure of privacy to the system. No other users, if inspecting this person's arrangement with the visualization application, would ever see the interim arrangements. In this way, users may control which arrangements are captured and which are not.

During the study of the "Connectibles" prototype, subjects observed that plugging a connectible into the friendFrame felt like a relatively permanent act. Some subjects also did not like the fact they had to push a button before they could rearrange their connectibles; they wanted a more plug and play system. It will be clear to one of ordinary skill in the art that modifications to accommodate such concerns are easily made. Further, it will be clear that object communication frames can be designed to allow additional frames to be plugged in on any side, permitting users to put together arrangements in a larger space.

One useful addition to both object communication frames and physical interactive objects is "sleep mode." The user can put a communication frame or individual interactive object to sleep, via a button press or any other suitable mechanism known in the art. Objects and frames still continue to receive messages, which are stored and queued. When the devices are woken up, any queued messages are then executed. Such a sleep system allows the user to disable output, such as in order to sleep without interruption or added light, without taking the system off the network. Another potentially advantageous addition to the frame is motion detectors and microphones that provide some indication of a user's physical presence near the frame.

Figure 9A:
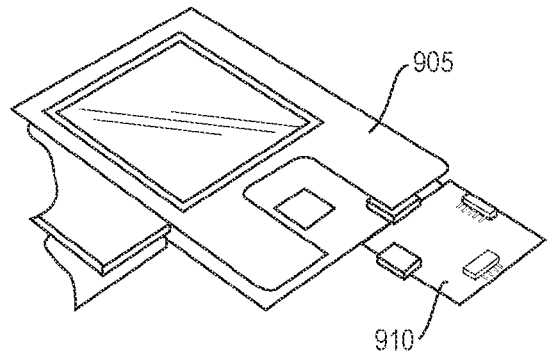
FIGS. 9A-D depict prototypes of an alternative embodiment of a tangible social network according to the present invention, wherein the interactive physical objects are connected directly together without the use of an object communication frame.
Figure 9B:
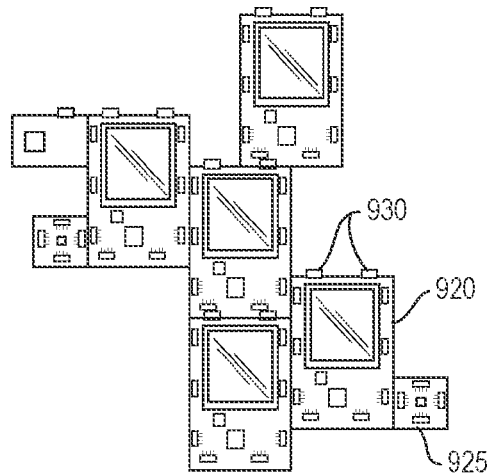
Figure 9C:
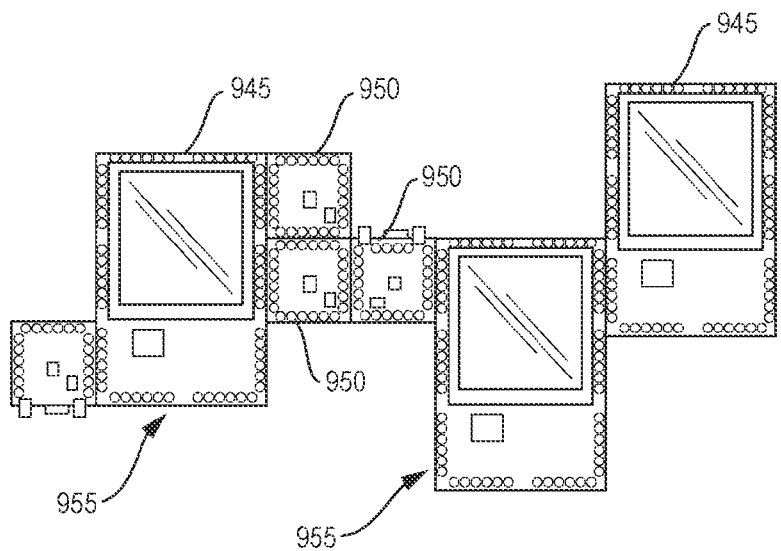
Figure 9D:
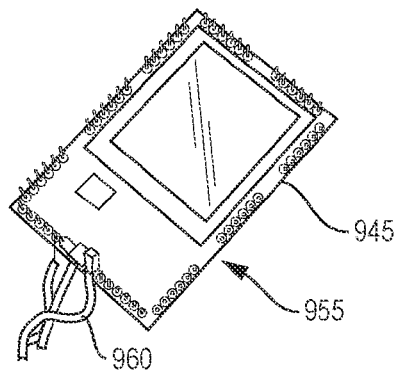

In one alternative embodiment, the system does not employ an object communication frame. Instead, the interactive physical objects are designed to snap directly to each other without the use of an object communication frame. This design requires either a special unit that provides power and communication to the outside world or that each interactive object have its own power and communication system. FIGS. 9A-D depict prototypes of this alternative embodiment of a tangible social network. In FIG. 9A, independent tiles 905, 910 are connected directly together via low profile, right angle pins and sockets. In FIG. 9B, connectibles 920, 925 of different size are directly connected with one another with special connector pieces 930. In FIGS. 9C and 9D, independent tiles 945, 950 with large pin header connectors 955 are connected by special jumper pieces 960. Large connectibles 945 with screens are pic connectibles, smaller ones 950 are glints.

It is clear that a connectorless system may also be advantageously employed in the tangible social network of the invention. The system can, in fact, be advantageously implemented on top of other systems such as, for example but not limited to, Sensetable [James Patten, Hiroshi Ishii, Jim Hines, and Gian Pangaro, "Sensetable: a wireless object tracking platform for tangible user interfaces," CHI '01: Proceedings of the SIGCHI conference on Human factors in computing systems, pages 253-260, New York, N.Y., USA, 2001, ACM Press] or Siftables [David Merrill, Jeevan Kalanithi, and Pattie Maes, "Siftables: towards sensor network user interfaces", TEI '07: Proceedings of the 1st international conference on Tangible and embedded interaction, pages 75-78, New York, N.Y., USA, 2007, ACM Press]. There may be, however, a trade off between interactive physical objects as a facile tangible interface and interactive physical objects as always-on remote awareness objects. That is, a system of pucks that are easy to move around may not lend itself to being permanently displayed in a home or office. Bouchard's Soundmites [David Bouchard, "Soundmites", 2007] suggest a good compromise in form factor. These devices could be easily slid around one another and did not require physical connection, but they also included magnets so that they could be attached to and displayed on a vertical metal surface. In general, connector-less form factors would entail a more technologically complex and expensive design of interactive object. Each interactive object would generally need to be self-powered and wirelessly networked, and the system as a whole would preferably be able to recover the arrangement of the objects through some type of localization scheme.

It will further be clear to one of ordinary skill in the art of the invention that the system does not rely on the use of particular form factors or material choices. For example, instead of a two dimensional grid-based object connection frame, wearable form factors such as bracelets and necklaces may be produced without additions to the current technology. A wearable system might consist of a bead-like form factor such as BuddyBeads, or a series of patches that could be affixed to a jacket or messenger bag. Such a system would eliminate the physical presence problem, since it would always be with the user. Flexible circuit boards could also be used instead of the current rigid designs in order to produce deformable, cloth-like interactive objects, such as, but not limited to, a quilt, wherein each interactive object attaches to the others via a very short but flexible connector. An arrangement thus forms a kind of blanket that may be hung or draped. Hiding the affordances is also possible and may be appealing. For example, all buttons and knobs could be hidden under a customizable faceplate, emphasizing the individuality of each object.

In a preferred embodiment, a visualization application supports the specifics of a tangible social network. The visualization application directly reflects the physical arrangement of the users' interactive objects. Thus, the visual application captures and displays social link information inherent in the component objects. In the preferred embodiment, each interactive physical object type is displayed with its own icon. Users can navigate to a friend's arrangements by double clicking on an interactive physical object that friend had given out. By clicking on subsequent interactive physical object in other user's arrangements, users may hop from their friend's arrangements, to their friend-of-friend's arrangements, and so on. This design, which was implemented in the "Connectibles" prototype, does not include privacy settings. It will be clear that privacy settings are easily implemented by one of skill in the art, and would permit a user to shield their arrangements from being viewed by others.

Figure 10:
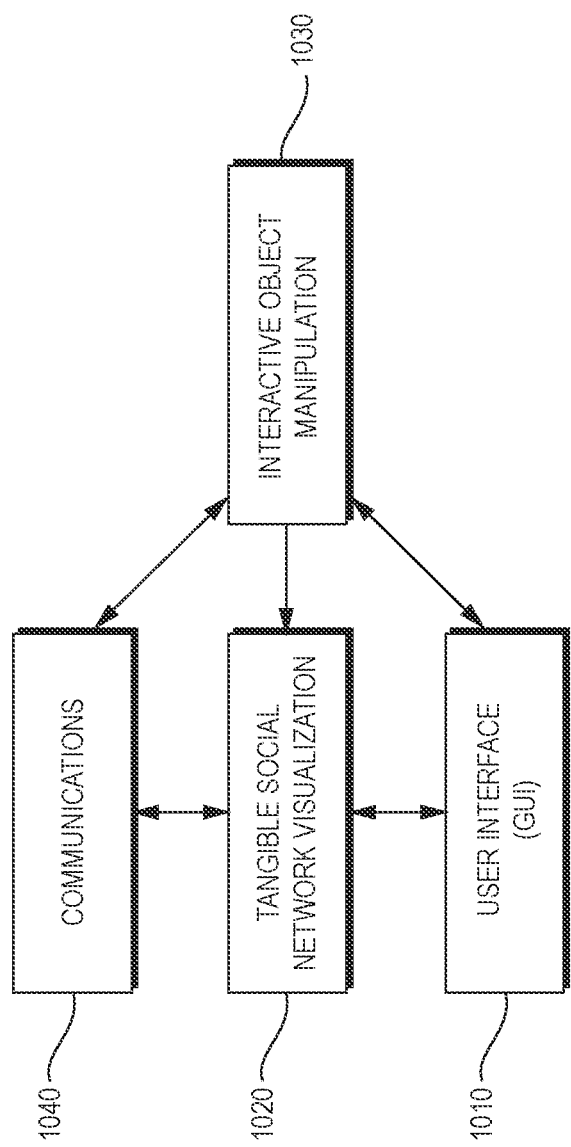
FIG. 10 is a block diagram of an embodiment of a visualization application, according to one aspect of the present invention.

FIG. 10 is a block diagram of one possible embodiment of an optional visualization application according to one aspect of the present invention. In FIG. 10, user interface 1010 communicates with tangible social network visualization subsystem 1020 and interactive object manipulation subsystem 1030. Communications subsystem 1040 receives information about the composition of a tangible social network of a user and communicates it to tangible social network visualization subsystem 1020, which derives a representation of the tangible social network of the user from the information received by the communications subsystem. This representation is presented to the user via graphical user interface 1010, which also accepts inputs from the user directed to management of the user's tangible social network and, via interactive object manipulation subsystem 1030, individual interactive physical objects.

Figure 11:
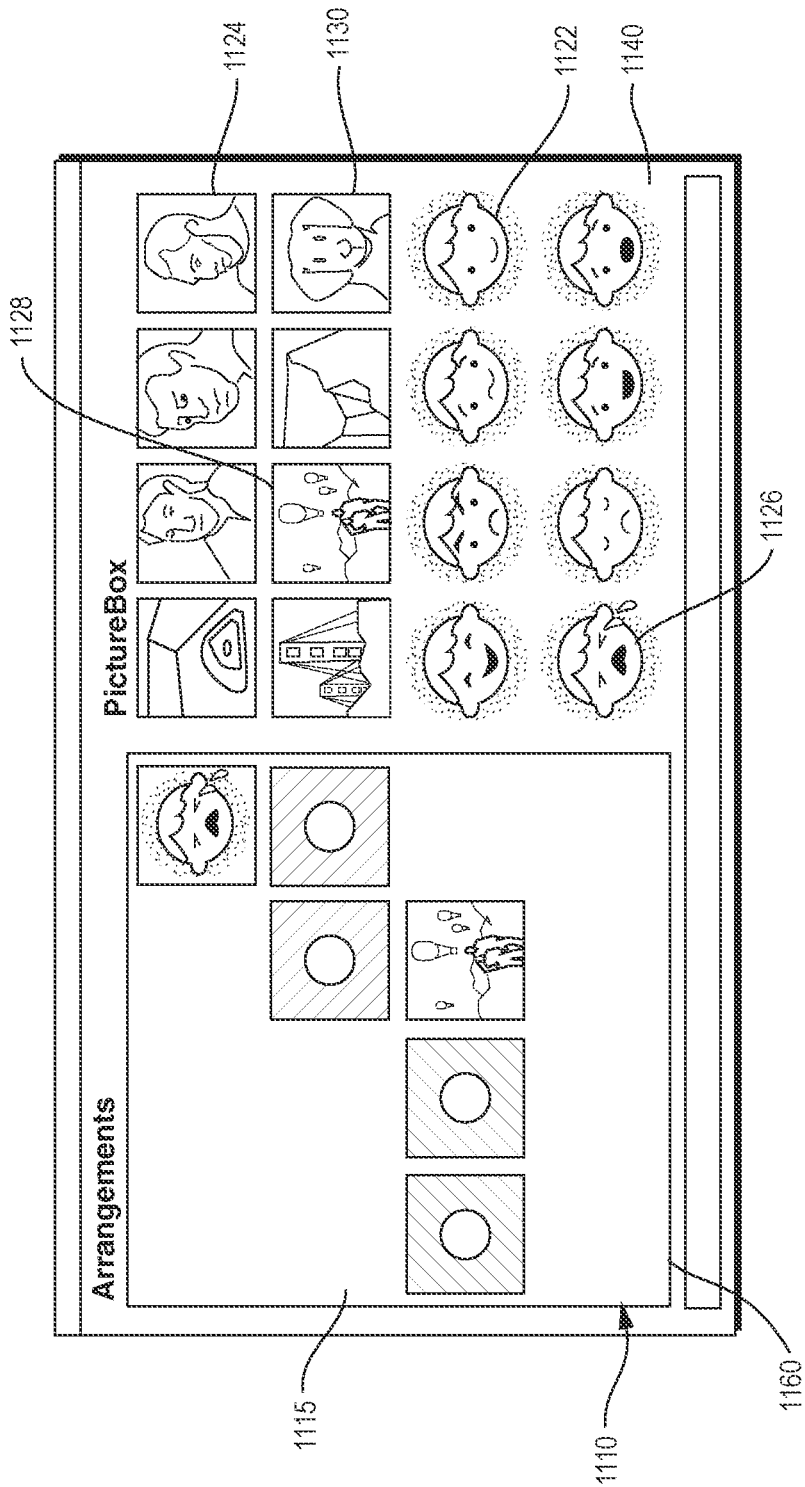
FIG. 11 is a screen shot from an example embodiment of a visualization application, according to one aspect the present invention.

FIG. 11 is a screen shot from an example embodiment of a visualization application. In FIG. 11, a representation 1110 of a user's connectible arrangement is shown on left window 1115, and images 1120, 1122, 1124, 1126, 1128, 1130 that this user can send to picture connectibles are shown on right window 1140. Left window 1115 automatically updates whenever any user changes the physical arrangement of his or her interactive physical objects. In the "Connectibles" prototype embodiment, the visualization application was implemented with Python code running on the PC, allowing the devices to hook up to the Internet in order to send messages. In particular, pyVisualizer is a piece of graphical software that allows users to see virtual representations of their connectibles and their friend's connectibles, as well as to send pictures to the pic (OLED) connectibles. The code was developed in Eclipse.

In the "Connectibles" prototype embodiment of the visualization application, each connectible type was displayed with its own icon. Connectibles and frames were color-coded. For example, one user owned a friendFrame decorated with pink felt in the physical space. All of the connectibles that this user distributed included a pink felt border. These connectibles were also colored pink in the visualization application. In this way, users could determine which connectible came from whom in both the physical and virtual space. In a fully implemented system, this color-coding might preferably be replaced with something that could disambiguate a larger number of users; for example, text might be more appropriate in such a case. It will be clear to one of ordinary skill in the art of the invention that any of the many suitable ways known in the art of disambiguating icons may be advantageously employed in the invention.

In the "Connectibles" prototype, users could navigate to a friend's arrangements by double clicking on a connectible that user had given out. For example, in FIG. 11, if the user double clicks on "green" connectible 1150, Arrangements window 1115 switches to display the "green" user's arrangement. The color of outline 1160 surrounding the Arrangements window was also color-coded, indicating which arrangement was being viewed. For example, if a user were viewing the green user's connectible, the outline of the Arrangements window would be green. The user could click any connectible in the visualization application to see the other users' arrangements, even if that user were not looking at her own arrangement to begin with. In this way, users could hop from their friend's arrangements, to their friend-of-friend's arrangements, and so on.

The "Connectibles" prototype visualization application also supports connectibles with PC-dependent messaging. In this case, it allows users to send images to picture connectibles with a drag-and-drop interface. In order to mirror the tangible interactions, in which a user triggers an output on one connectible by interacting with its counterpart, a user sends an image to her friend by dragging the image onto the representation of the partner connectible given to her by that friend. While the prototype visualization application used during the evaluations supported only sixteen possible images, it will be clear that the system can be designed to allow users to input arbitrary images from the web or their own collections into the system. Importantly, users do not need the visualization application to use the system. If the user did not care about the arrangements of other users, and did not care to either use picture connectibles or send images to them, then he or she would never need to use the visualization application. The system therefore works without relying on a GUI running on a PC.

The current Graphical User Interface component of the prototype system is implemented as an installable application. However, it is trivial to port this application to a web-based system, accessible via a browser. This would allow users to use this component on any computer or device with a web browser, such as a wide variety of mobile phones and similar devices. Personal computers are therefore not a necessary component of a tangible social network system. Implementing a fully functional mobile system is within the ability of one of skill in the art and is a natural next step. The visualization application can also be augmented over the prototype in myriad ways. In particular, it can trivially provide all of the functionality that commercial virtual social networks now provide.

In general, the visual representation of the interactive objects can easily be made to reflect their physical state. The prototype visualization application only reflects the users' connectible arrangements, but it can easily be augmented to show, for example, the state of the knob and picture objects. Representations of interactive objects might be rendered more or less transparent based on the number of messages they have sent or received. Representations can also be editable with a simple drawing tool, allowing them to be customized just like their physical counterparts. Overall, richer representations of the interactive objects will reveal more information about the social relationships of the users. The richer virtual representations of the objects could also be stored over time and made available to the users. The visualization of the history of the arrangements and states are capable of revealing a lot about one's social network. For example, one prototype visualization application includes a scroll bar, which allows the user to browse through the history of arrangements. The history of received and sent images may also be associated with the virtual representation of the picture objects.

Network architecture. The design goals dictated the network architecture of the system. This communication layer is designed to be general purpose. First, it can support arbitrarily large numbers of users and interactive objects. Second, it preferably operates over the internet (TCP/IP), rather than local intranets, so that messages can be sent from anywhere to anywhere. Third, messages arrive in close to real time in order to support synchronous behavior. Fourth, the architecture supports arbitrary messages. Since designing different kinds of interactive objects is straightforward and requires little knowledge of the underlying network protocol, there are no strong constraints on the types of interactions the system can support. Fifth, the architecture can digitally capture user's arrangements, making them accessible at a distance. Finally, the architecture supports the required exchange semantics.

It will further be clear to one of ordinary skill in the art that while the specific network architecture employed may, if desired, be customized to the requirements of the specific objects, frame, and visual application employed, the actual objects employed, including their interaction possibilities and physical design, are fully separable from the network protocol used. The protocol described herein is designed specifically to support the simple and robust creation of large networks of paired personal remote-awareness physical objects of many different types. The protocol provides a means for physical devices to form direct channels to one another via personal exchange, without requiring any special activation or user behavior in order to form the link. In other words, if Bob has device A and Alice has device B, they just need to exchange them and the devices will be linked without any special action on the part of Bob, Alice, or anyone else. This scheme is incorporated into the larger network protocol of the system, enabling lots of objects to form paired channels that can communicate globally. In a preferred embodiment, this occurs via the Internet using TCP/IP, but any of the many other suitable methods, protocols, and communications means known in the art are suitable and within the scope of the invention.

The protocol developed for the present invention is novel in itself. In fact, the protocol is in large part separable from the physical design of the system, and many different design decisions may be made without changing the network protocol. The network protocol does two main things: it transmits arbitrary messages from one interactive object to its partner over a two-tiered system, and it automatically pairs reciprocally exchanged objects so that they each have a destination for those messages.

In the prototype, Tier One handles communication from connectibles to friendFrame. Tier Two handles communication from friendFrame to friendFrame via a TCP/IP connection. In this implementation of the network protocol, the friendFrame microcontroller accesses a TCP/IP socket via a serial-USB connection to a host computer. However, the friendFrame printed circuit boards (PCBs) include pads for a WiPort embedded 802.11 WiFi radio, which can free the friendFrames from the wired connection to the host computer. Implementing code to interact with the WiFi module is trivial and does not even require manufacturing a new friendFrame PCB.

Figure 12:
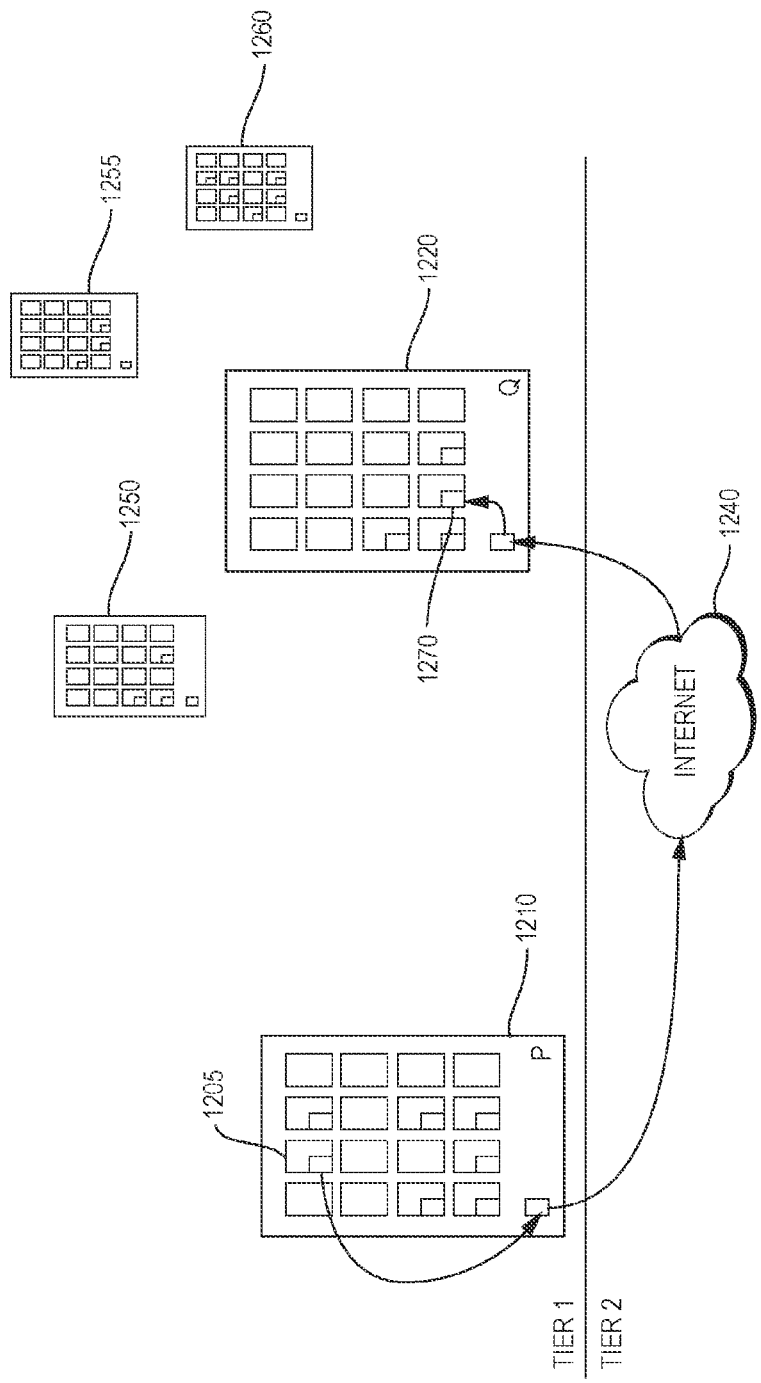
FIG. 12 is a schematic of an example embodiment of a communications protocol, according to one aspect of the present invention.

FIG. 12 is a schematic of an example embodiment of a communications protocol according to one aspect of the present invention. In FIG. 12, a message is generated, sent, and executed across the network protocol. First User P interacts with interactive physical object m 1205 in frame P 1210, generating a message r. Frame P 1210 picks up message r from interactive physical object m 1205 and routes it to the destination frame Q 1220 via network 1240 A message can be routed to any object communication frame 1220, 1250, 1255, 1260 and any resident interactive object, but the interactive object m 1205 already knows that is paired with interactive object n 1270 on frame Q 1220. This information is contained in the message r, and the various waypoints in network 1240 note the address information and route the message accordingly. Once frame Q 1220 receives message r, it is delivered by frame Q 1220 to destination interactive physical object n 1270. It will be clear to one of skill in the art that the simplified schematic representation of FIG. 12 does not show the checks that must be executed in order to successfully route a message, and that the depicted message contents of r are simplified for clarity, but that the implementation of such details is well within the knowledge of one of ordinary skill in the art of the invention.

How the object communication frame talks to the interactive physical objects and vice-versa, and how the frame knows that an object is in a cell are functions handled by Tier One. The messages that are handled by Tiers One and Two are generated when the user interacts with an interactive physical object (for example, turning a knob) or when the user creates a computing device-dependent message (for example, sending an image with the visualization application). The messages are routed to a destination object, which knows how to interpret the message to change its own state (for example, a knob would change how many LEDs it has lit, or a picture object would change the image it is displaying).

Figure 13:
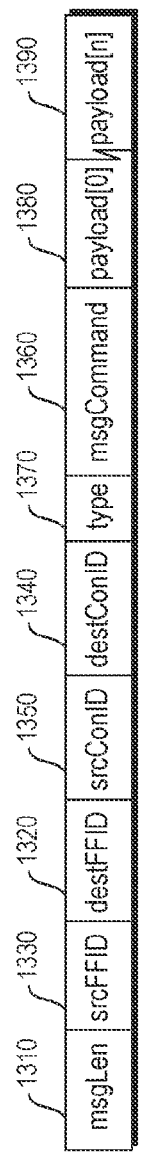
FIG. 13 is a diagram of an embodiment of a network message format usable with the protocol of FIG. 12, according to one aspect of the present invention.

In the "Connectibles" prototype, all network messages have the same format. The protocol's message is divided into bytes, as shown in FIG. 13, which is a diagram of an embodiment of a network message format usable with the protocol of FIG. 12. The bytes correspond to msgLen 1310, destFFID 1320, srcFFID 1330, destConID 1340, srcConID 1350, msgCommand 1360, type 1370, and payload[0] . . . payload[n] 1380, 1390. The field msgLen 1310 describes how long, in bytes, this message is. The field destFFID 1320 is the ID of the friendFrame to which this message is headed. The destination connectible is necessarily located on this friendFrame. The field srcFFID 1330 is the ID of the friendFrame from which this message originated. The source connectible is on this friendFrame. If the message was created by a visualization application, the application fills in the correct, associated friendFrame ID. The field destConID 1340 is the ID of the connectible to which this message is headed. The field srcConID 1350 is the ID of the connectible from which this message originated. If the message was created by the visualization application, the correct connectible ID is filled in. The field type 1370 denotes the type of connectible: knob, button or picture. This information could eventually be folded into ConID.

All of the ID information is stored in each connectible; the messages are generated in full each time a user initiates a message. Since the IDs are all only a byte, the prototype protocol supports only 255 independent friendFrames and 255 independent connectibles. This was done for simplicity and because the small scale prototype did not need to support more than this many devices. A simple extension increases the size of these IDs to lengths that allow a much larger universe of devices (for example, 4 bytes, yielding about 5 million unique IDs).

The field msgCommand 1360 tells the destination connectible how to interpret its payload, if a payload exists. For example, msgCommand 1360 might be GLOW LEDS, which instructs a button connectible to glow its ring of LEDs. Each connectible knows how to interpret a subset of all possible msgCommands. As long as the connectibles know what to do with a message, the system will handle all communication: this is what makes adding connectibles easy. New connectibles simply need to include the communication libraries, generate a message on user input, and know how to interpret an incoming message to produce an output. payload provides arguments for msgCommand. Payloads are of length 0 to 10. For example, the GLOW LEDS command takes nine arguments. The first eight are binary, and tell the connectible whether or not to glow a particular one of its eight LEDs. The last argument tells the connectible how many times to glow the LEDs. It will be clear that other versions of the protocol could trivially permit the maximum payload size to be much larger. The limitations on message size in the prototype were primarily because of the small RAM size on the AVRs (1 k for the Atmega88). A streamlined protocol and/or larger microcontroller would easily solve this problem.

In the prototype, Tier One allows connectibles and friendFrames to communicate. It does so using the I²C protocol. I²C is a flat bus, in that the SDA and SCL lines are shared between all communicating ICs. This means that it is highly extensible; if it is desirable to add a new device to the system, all that must be done is to hook it up to the I²C pins. Other protocols, such as UART and SPI, require dedicated pins for each new device added to the bus. These protocols are therefore not extensible, requiring new board layouts as the number of devices grows. Connecting frames would therefore likely be more easily supported by I²C. If every device is connected to all the others, a means must be provided so that one device can talk to another without the others listening in. The I²C protocol implements a 7-bit addressing scheme. Each I²C message includes an address along with the packet of bytes. Note that I²C messages are not network messages. Also, I²C addresses are not connectible Ids. Devices only accept packets that are prefixed with their I²C address. A device can also send a message to all others using a "general call address," usually 0x00.

Since connectibles can be freely added and removed from the friendFrame, the friendFrame knows whether a connectible is present in a cell by means of the enumeration scheme. Similarly, the friendFrame can communicate with a "new" connectible, even though it cannot know in advance that connectible's I²C address. This is also accomplished by the enumeration scheme. In this scheme, the friendFrame periodically "enumerates" the cells, looking for new connectibles and noting removed connectibles. Enumeration always occurs when the user rearranges her connectibles; it is triggered when the user presses the "rearrangement" toggle button on the friendFrame. The friendFrame keeps a local table in RAM of the state of all its cells. Each element in the table includes information about its corresponding connectible, such as ID information and connectible type. This information is then recovered during the enumeration process.

The enumeration process is straightforward. The friendFrame does the same process for each cell, serially moving through all of them. For a given cell, the friendFrame first pulls the ENUM pin low. It then sends a message addressed to all devices, asking "if you detect that your ENUM pin is low, please respond." All other connectibles present in other cells will thus hear the message, but ignore it. If a connectible is present in that cell, it will send an acknowledgment message back to the friendFrame. If no one is present, the friendFrame will time out and move on. If a connectible is present, the friendFrame will assign it a locally unique I²C address. At this point, the friendFrame will be able to communicate with the connectible without using the ENUM pin and general calls. The friendFrame then recovers various critical information from the connectible and stores it. This process continues until all the cells are covered. If the friendFrame finds that a connectible is no longer present in a cell, it simply erases that connectible information from its internal table.

An early "puzzle piece" prototype implemented a more complex enumeration scheme, known as a "distributed recursive token passing" algorithm. Briefly, the power unit would first enumerate its neighbors, then ask each neighbor to enumerate its neighbors. This process would recurse all the way out to the "leaf" connectibles. If a neighbor connectible had no non-enumerated connectibles, it would stop the process and report back. In this way, the recursion would collapse and end. Such a scheme might be usefully adapted for a future friendFrame that accepts add-on frames.

Once enumeration is complete, the friendFrame begins the communication process. This is also straightforward. Each connectible, when a user interacts with it, stores a message in its outbox. For example, a button connectible will store a GLOW LEDS message in its outbox when a user presses its button. The outbox is stored in the AVR's RAM. This message has all of the information necessary to route it to the partnered connectible. Messages thus get queued up in the outbox as the user interacts with a connectible. These outboxes are circular buffers that store up to 5 messages. If the outbox becomes full, the oldest message is overwritten with the latest. However, it is extremely rare for more than one message to accrue, given the 100 kHz speed at which the Tier One protocol operates. The friendFrame continually loops through the cells containing connectibles. If a connectible is present, the friendFrame asks (over I²C) if that connectible has any messages in its outbox. If so, the friendFrame requests all of them. The connectible will empty its outbox, and the friendFrame will move the messages to its own set of outboxes. The friendFrame prototype has one outbox per cell.

The friendFrame then drops off any messages it received from Tier Two into the inbox of the connectible. The inbox is also a circular buffer, capable of storing five messages. This ends the communication between the two devices, and the friendFrame moves on to the next connectible. As soon as the communication is over, the connectible begins executing and de-queuing the messages in its inbox, resulting in output behavior visible to the user. Note that the connectibles are slaves in this protocol; in general, they do what the friendFrame tells them to do. This process continues forever, with the friendFrame dropping off incoming messages to connectibles and sending outgoing messages to Tier Two.

Tier Two handles messages between friendFrames. As mentioned earlier, the friendFrames access the internet via TCP/IP using a host computer. The host computer runs a python demon that communicates with the friendFrame via USB-serial link. This serial socket link is software-protected against any electronic or power failures on the friendFrame; it re-creates itself if it dies, waiting for the friendFrame to come back online. The demon is able to create TCP/IP sockets to send messages to arbitrary locations on the internet. Once a friendFrame has picked up and dropped off all messages from its connectibles, it gets ready to send and receive messages from Tier Two. The friendFrame acts as a master for both Tier One and Two. The python demon acts as a slave, waiting for instruction from the friendFrame.

First, the friendFrame tells the demon that it is ready to send outgoing messages. The demon notes this. The friendFrame waits for an acknowledgment, then sends all outgoing messages via the USB serial link to the demon as a byte stream. The demon encodes all these messages into lists, and stores them in its own outbox. At this point, the demon sorts its outbox according to the destFFID's of all its component messages. It takes all the messages for each destination and serializes them. It then finds the url corresponding to the destFFID in an internal look up table. This table is hard coded locally within each demon, making the system totally peer-to-peer. A larger system might use a dedicated DNS server or a more sophisticated peer-to-peer lookup system. Finally, the demon opens a TCP/IP socket to the correct address, and sends along the serialized messages. It does so for the whole outbox, emptying it out completely. All the demons run a server socket in a dedicated thread. This server accepts all incoming messages, parsing them into lists and placing them in a thread-safe inbox. These inboxes are emptied out and sent to the friendFrame. The demons rely on the DynDNS service, which allows individual machines to keep human-readable urls even as their IP address changes (if they move to do a different room, for example). Using DynDNS means that the tables do not ever need to be updated or changed, even if the host computer moves across the country.

After sending messages, the friendFrame then tells the demon that it is ready to receive messages, again waiting for an acknowledgment from the demon. The demon then encodes the incoming messages in its inbox into bytestreams and sends them over the link to the friendFrame. The friendframe receives the messages byte by byte, timing out on each byte and throwing out any message with a lost byte. The friend Frame notes the destConID of each successfully received message, and places each message in the appropriate outbox. If the friendFrame does not contain a connectible with a destConID contained in a message, it throws the message out. This should never happen, however. Once this process is complete, the messages get distributed to the destination connectibles via Tier One. Importantly, the friendFrame can also tell the demon the state of all its connectibles; it does so after each enumeration. The Visual application can communicate with demons to find out these states, and thus display the physical connectible arrangements.

The prototype connectibles system routes all user-generated messages from one connectible to a partnered connectible. However, it is trivial for these messages to be executed not by the connectible on a friendFrame, but by the friendFrame itself. For example, the friendFrame could include a soundcard and speaker system to output audio messages generated by a user. Because the message must pass through the friendFrame, the friendFrame can determine whether it should route the message to a destination connectible or take action on it itself. The advantage here is primarily cost; building in more complex human input/output systems into the friendFrame means that one need not have redundant and complex human input/output systems on each connectible.

The visualization application is part of Tier Two. It is implemented in python; the GUI uses the pygame module. It runs independently of the communication demon. In order to render a connectible arrangement, the Visual application can ask a python demon for arrangement information. The Visual application has a hard coded url lookup table like the demons. Again, this table could be made available on a dedicated server. Thus, the visualization application can retrieve arrangement information from any friendFrame via the demons. This arrangement information contains not just the types and locations of the connectibles, but also their address information. An optional implementation also passes the current states of the connectibles (for example, how far a knob is turned) to the visualization application so it could render that as well.

When a user initiates a PC-dependent message, such as sending an image to a connectible, the visualization application can look up the message's destFFID and the destConID using the arrangement information it has acquired from a demon. It then opens a socket directly to the destination demon and sends the message. The message includes source ID information (srcFFID and srcConID) as if it originated from the connectible itself. The visualization application is thus built so that it can be run anywhere and access and communicate with any friendFrame.

The pairing process is designed such that users do not need to engage in any special behaviors to ensure that any connectibles they exchange can communicate with one another. Using a couple of rules, the protocol allows this. By keeping track of their IDs, the network protocol allows exchanged connectibles to automatically pair up. Connectibles store four address fields: destFFID, srcFFID, destConID and srcConID. Connectibles are "born" with their unique srcConID. In the prototype implementation, they are also born with a destFFID. This is a safe assumption: if connectibles were ordered online, the retailer would initialize the connectible with this information. If, however, they were purchased in the store, it is trivial to add a simple way to initialize the connectible to its source friendFrame, such as, but not limited to, providing a special cell on the friendFrame that is specially dedicated to initializing brand new connectibles. Of course, a "fresh," unexchanged connectible will not know its srcFFID or destConID. It does not know with whom it will be exchanged. The connectible's destFFID will be, once it is exchanged with someone, the place to which it sends messages. The connectible leaves the home of its owner, and once it is in a new friendFrame, it sends messages back to its giver's friendFrame: this friendFrame is therefore the destination (destFFID) for its messages.

Figure 14:
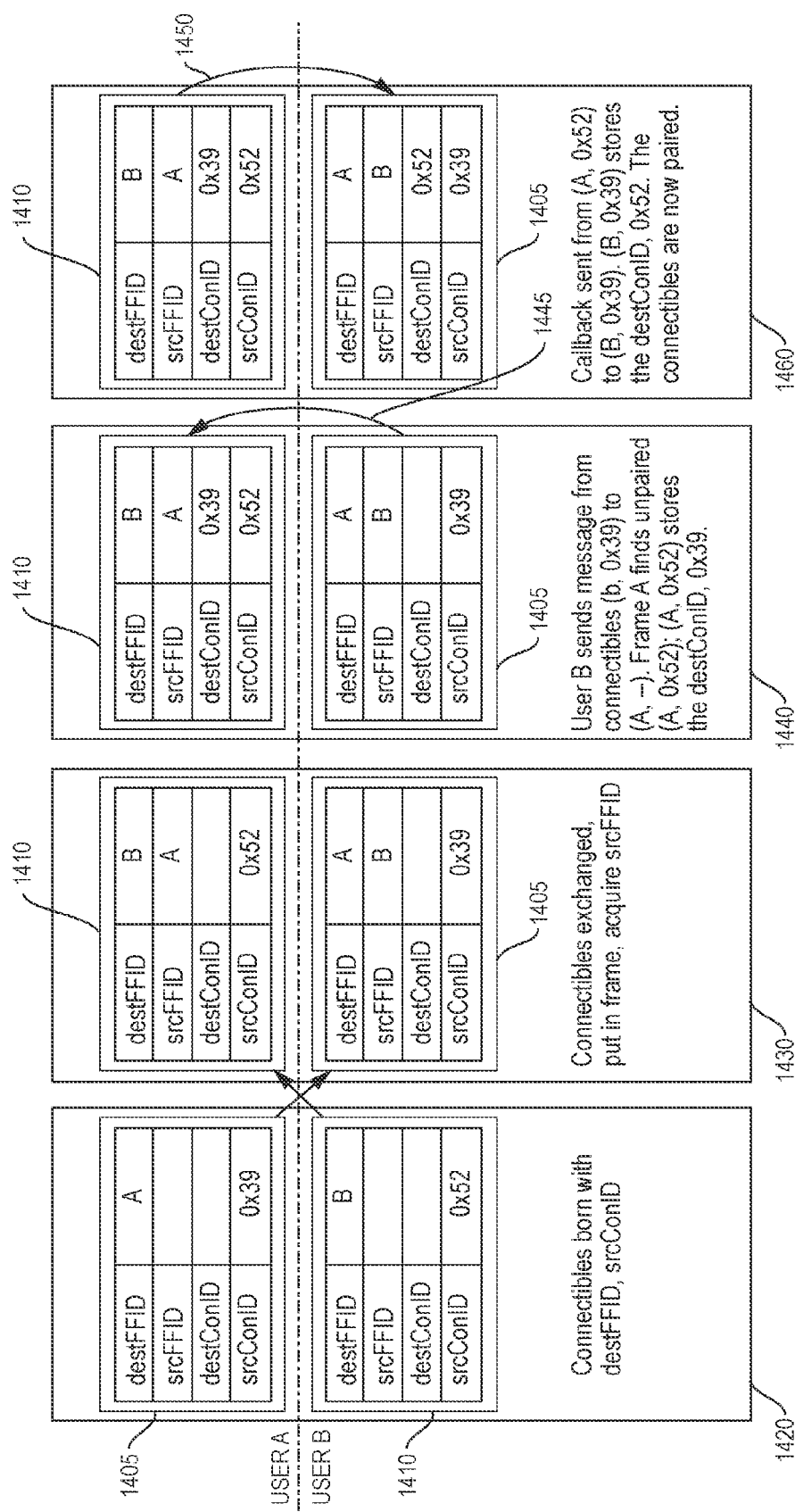
FIG. 14 is a schematic of an example embodiment of the protocol used for the establishment of a communications link between a pair of reciprocally exchanged interactive physical objects, according to one aspect of the present invention.

FIG. 14 is a schematic of an example embodiment of the protocol used for the establishment of a communications link between a pair of reciprocally exchanged interactive physical objects according to one aspect of the present invention. As shown in FIG. 14, the interactive physical objects 1405, 1410 are initialized 1420 with dest FFID and srcCONID. When an object is exchanged and put into an object communication frame, it acquires 1430 srcFFID. Next, User B sends 1440 a message 1445 from the exchanged interactive physical object back to the source frame, which locates the corresponding unpaired interactive physical object and stores the destConID. Finally, a callback 1450 is sent 1460 from the corresponding interactive physical object to the exchanged interactive physical object, which stores its destConID. The interactive physical objects are now paired.

In an example of how the prototype system operates to pair interactive objects, Mary and Kate exchange connectibles, with the connectible from Kate being labeled "K" and the connectible from Mary being labeled "M." Mary plugs K into her friendFrame. Kate has not yet plugged M into hers. Once K lands in Mary's friendFrame, the friendFrame enumerates it. The friendFrame discovers that K is a fresh connectible, and updates its srcFFID. Mary sends a message to Kate. The connectible knows to send the message to destFFID, its home. The message will go through Tier One and Tier Two, arriving at Kate's friendFrame. However, the message will not have a destConID. A friendFrame will do the following if it receives a message without a destConID. First, it will search to see if this message's srcConID matches any of its own connectibles' destConIDs. If so, that means that the sending connectible is already paired, but for some reason has not yet received a callback. In this case, the friendFrame routes the message to the right connectible, and sends the callback message. If the friendFrame does not find any connectibles that are a match, it then searches for any fresh connectibles it has. If it has none, it will throw the message out. In this example, the message will be thrown out, since Kate has not yet plugged M into her friendFrame.

When Kate does plug M in her friendFrame, M goes through the same process as K, acquiring a srcFFID. Mary sends another message. This message arrives at Kate's friendFrame. This time, the friendFrame finds a fresh connectible, M. It first checks to see if the message's destFFID matches the fresh connectible's srcFFID. This check is important. If, for example, Kate had also received a fresh connectible E from Esther, the friendFrame must not accidentally pair E and M. If it finds a connectible with a matching srcFFID, it then checks the connectible's type. This check is also necessary. If Kate and Mary had exchanged two pairs of connectibles, two knobs and two pics, the pairing process must not pair a knob with a pic, since these two connectible types do not usually have a way of mapping their messages to one another. If the fresh connectible passes these tests, the friendFrame will tell it to store the message's srcConID as its destConID. The connectible AVR stores this information in EEPROM, so that if it ever loses power (for example, by being moved), the information will not be lost. At this point, connectible M is paired; all its messages will be sent with a destConID, routing the message directly to its partner connectible. Finally, M executes the message.

Once a fresh connectible gets paired, it immediately sends a callback message back to its partner. This message tells the connectible to store the message's srcConID as its destConID, ensuring that both exchanged connectibles get fully paired. The protocol also handles problems if the callback message does not arrive. The protocol ensures callback messages keep getting sent until they arrive. In truth, the callback messages should always arrive, so this scenario is pretty unlikely. Still, it is wise to protect against these cases, since they would break the protocol if they do occur. At this point, the connectibles are paired and participate in the operational communication protocol described previously. The exchange process ensures that only the connectibles that users exchanged get paired. It also means that the users can plug in their connectibles at any time without ill effect, that they can plug them in any arrangement, and that they can exchange multiple different connectibles with multiple different people at once. It also handles visualization messages as if they originated from the actual connectibles, ensuring that pairing can occur without a problem.

There is one case in which the protocol might require some user intervention. If two users exchange multiple connectibles of the same kind at the same time, the protocol will pair them in the order they were placed in the friendFrame, from left to right, top to bottom. In this case, the protocol will work fine, but if the users want to pair particular connectibles, then they would have to coordinate how they plugged them in. For example, they could plug them in one at a time, send messages, and then add the others. This case seemed rare enough and the user action simple enough that it did not justify requiring special handling for the prototype system, but it is clear that such handling could be easily implemented if desirable.

It will be clear to one of skill in the art that, while the protocol described may be advantageously employed in the implementation of the present invention, many other equivalent protocols would be suitable. The invention therefore does not require the described protocol and should not be limited thereby. Further, while the prototype system sits on top of TCP/IP as its low-level communication ("transport" and "network") protocol, the system would work equally well using alternative protocols known in the art. For example, transport protocols determine how a message gets from point A to point B, given an addressing scheme. IP is one such addressing scheme (also known as a "network" protocol), but alternative transport protocols that could be used include, but are not limited to, UDP and SCTP. In particular, UDP is well suited for streaming, high-bandwidth data such as video and audio. A system supporting these outputs would use UDP instead of TCP for higher quality content delivery. Alternative network protocols include, but are not limited to, IPv6 (a subset of IP with a larger address space) and IPSec (secure IP).

The data link layer sits below the transport and network protocols. The prototype implementation uses WiFi and/or Ethernet. However, the data link layer could be switched trivially to another type of protocol, including, but not exclusive to WiMAX and EVDO. Long-range protocols such as WiMAX and EVDO would particularly support mobile implementations of connectibles, such as bracelet or other wearable form factors. The friendFrame might also use a PAN (Personal Area Network) or LAN (Local Area Network) technology (including but not exclusive to Bluetooth or Zigbee) to link to another device, such as a mobile phone or computer. A simple daemon (background software running at all times) would intercept messages from/to the friendFrame, and transport them using whatever data link that device included (WiMAX, WiFi, EVDO, etc.). This type of system would allow users to send messages from their mobile phones to friendFrames and connectibles, by for example, taking a picture on the cellphone and sending the message to a friend's connectible.

It will be clear to one of skill in the art that a tangible social network according to the present invention can be folded into a fully developed virtual social network, complete with rich profile and messaging tools. Further, the data generated in the physical space may be used to drive more abstract visualizations. For example, the arrangement and interaction histories could have been used to extract a node-edge graph, in which nodes represented users and edges and edge thickness represented relationships and relationships strength, respectively. Based on the user-generated semantics design principle and the early cardboard prototype experiment results, it was determined that it would be presumptuous to assume that the users' arrangements and behaviors could be interpreted and abstracted in a way that reliably captured their intentions. Instead, the prototype visualization application reflected exactly what the users had done in the physical space, without interpretation. Users could therefore layer their own arrangement interpretations on top of these visualizations. It will be clear to one of skill in the art that interpretation and/or abstraction of the user choices could be employed if desirable.

The ability for users to endow a variety of specific meanings onto the interactive physical objects provides a great deal of room for the users to signal specific things about their social relationships. Exchanges and messages need not be stereotyped or "pre-canned" acts. This suggests that the system is rather well-suited to reliably represent social relationships, since there is room to "spend" on the signals embodied in exchange and communication. In the studies, the physicality of the design seemed critical to almost all the subjects; physical objects clearly embodied a deeper sense of social connection than virtual representations of social relationships.

It can be seen that the prototype system satisfies the basic requirements of a tangible social network. First, the connectibles are gifts; the system therefore consists of social objects (requirement 1). The connectibles enable direct channels of communication between the people represented by them (requirement 2). The visualization application allows users to view captured social link information inherent in the exchanged connectibles (requirement 3). Of course, within this definition, a range of design choices remain open; the decisions made in the implementation of the system are implicitly described in the scenario. The four most important questions are: (1) How does the physical form of the connectibles determine how they can be physically arranged, and how does this inform what meaning the arrangements might acquire? (2) How do different types of connectibles support social communication channels? (3) How does the network layer capture the exchange of connectibles? (4) How does the visualization application integrate with the physical system in terms of both displaying social information and supporting interaction with physical connectibles?

The invention was developed with this principle in mind. If the interactive physical objects are to support intimate communication across a wide variety of users, the system should not arbitrarily constrain the types of interactions in which these users can engage. One of the main contributions of the system is its ability to generically support tangible remote awareness devices. The scenario describes several types of specific interactive objects, but the underlying protocol was built to support arbitrary messaging. Further, the system does not attempt to predetermine the specific meaning of messages between users, nor specific meanings in the way users interpret connectible arrangements. To be sure, the physical and interaction design will bias users to certain behaviors. But within that context, the design is not meant to interpret on the user's behalf. The users themselves determine what the messages of the different interactive objects signify, and they also get to determine what their object arrangements mean. A system that supports symbolic physical objects ideally provides wide latitude for such "user generated semantics."

Tangible interfaces preferably also engage users who do not like or do not understand the GUI paradigm. The present invention supports such users, as the system is usable without requiring a PC. In other words, the system has a low barrier to entry, or "low floor." A user can therefore can use the invention without having to use a computer. In particular, the users do not have to engage in a special pairing procedure to "tell" the system to pair the reciprocally exchanged objects.

A typical user will decorate her objects, customizing them for her friends; she exchanges them; she arranges the objects she's received in her frame; she uses the objects as an ambient, persistent communication channel to her friends; and she uses the visualization application to explore her and her friends' social network structures. In a specific illustration of how the invention might be used, Mary, a freshman in high school, returns home from school in the afternoon. She checks the mail, and sees that her Connectibles set has finally arrived. Inside the package she finds a rectangular friendFrame: the front has small empty cells arranged in a grid and it has a stand to prop it up, like a photograph frame. One connectible can be plugged into each cell. There are also eight connectibles inside the package. Two of them have metal knobs on top, two have plastic buttons. The last four look like small, thin displays. Mary and her friends Michelle, Kate and Esther are always sending each other pictures over Facebook, so she decides to set aside one display, or "pic," connectible for each of them. Michelle is Mary's best friend; they share everything. Mary decides to set aside a knob and a button for her. Mary chooses to save the other connectibles for later and tosses them in her backpack. Mary then starts decorating the connectibles. Rustling through her drawers, she grabs some glue, felt and stickers and goes to work, personalizing each connectible.

The next day, the four friends meet up at lunch. They all exchange connectibles with one another. Mary and Michelle exchange two knob connectibles, and agree to crank the knobs low when they are feeling lonely, and high if they are in a good mood. The friends finish exchanging connectibles as the bell rings for class. When Mary gets home, she places the connectibles she just received on her desk. Mary decides to cluster all the pic connectibles in the center of the friend-Frame. Since Michelle was really the person that introduced all the friends to one another back in junior high, she places Michelle in the center of the frame. Once the connectibles are plugged in, they light up. A picture of Esther and Mary from a field trip appears on Esther's connectible; a picture of koala appears on Michelle's pic connectible. Excited, Mary turns Michelle's knob connectible all the way. Not long afterwards, the knob connectible lights up all the way: Michelle must be sitting in front of her friendFrame, turning Mary's knob connectible.

Mary goes to her computer and logs onto the Connectibles website. Once logged in, the visualization application starts up. With it, Mary sees her arrangement of connectibles represented graphically. She loads up some pictures from a folder on her computer; they pop up in a window next to the connectibles arrangement. Mary drags a picture from seventh grade over to the connectibles on the screen, thereby sending them to her two friends. Mary decides to check out her friend's arrangements. She clicks on Michelle's connectible, and sees Michelle's arrangement. It must have twenty connectibles! She scrolls over the connectibles; it looks like Michelle's whole family is represented in one cluster. Michelle is pretty close to her family. In fact, it looks like she has a couple buttons and a knob just for her mom. That makes sense; Michelle's mom hates using computers. The button and knob connectibles work without needing to use a computer at all.

Mary then finds her own connectible next to Brandon's. Mary clicks over to Brandon's arrangement to see who's on it. John, from Mary's old summer camp; Mary wonders how Brandon knows John. Something to talk about at lunch maybe? Over the course of the summer, Mary glances at her friendFrame, checking to see how Michelle is doing, calling her if her knob is low. She adds a few more friends, and changes the arrangement. She is able to browse through her friend's arrangements, and look at how they change. Mary likes glancing at her friendFrame as she works on her computer or reads a book, just get to a sense of what her friends are up to. She's grown especially fond of Michelle's pic connectible, browsing through all the pictures she has received with two small buttons on the connectible itself. Mary decides to take the FriendFrame with her to camp, and puts it by her bunk, so she can be close to her friends even though they are not around. She brings some extra connectibles with her, hoping that she might make a few new friends there as well.

The prototype invention was subjected to three different evaluations. The first was with cardboard prototypes. This study was conducted to test whether people could use arbitrary physical objects as symbols for other people in their lives, and explored how people map qualities of their social network onto arrangements of these symbolic physical objects. The second and third studies were conducted with the full, working prototype system, and were meant to elicit users' responses to the system and the tangible social networking concept in general. The two final evaluations were thus designed to illicit responses from users that would apply to a full system.

Evaluation One: Mapping the Social onto the Physical. Each subject in this study was given a set of cardboard puzzle pieces, and asked to label each piece with a post-it note. The subject was asked to write on the post-it the name of someone to whom they were close. They were then asked to arrange these pieces in any way they saw fit. Each subject was asked to do this task under a few different conditions; each condition varied different factors, such as the shape and size of the puzzle pieces. This study was run with five subjects, four male and one female; each session lasted about one hour. This study determined that individuals do readily map social structures to arrangements of physical objects, and they typically do so according to simple rules. For example, physical proximity of two objects means that the people represented by those objects are socially close. Second, the limitations of physical objects encouraged rich mappings. The physical design of the objects prevented certain kinds of actions. For example, each physical object could not be connected to all the others, since it had a limited number of connection points. The kind of node-edge graph often used to visualize social networks could not be easily translated into the puzzle piece design.

This design actually encouraged richer mappings than the more flexible node-edge structure. Because subjects had to make choices, it required them to carefully think through their arrangements. One subject wrote, "I struggled with the shapes at first . . . It took a while to think of nuanced meanings. But I began to see them . . . I could make explicit what I was just defining and negotiating in my head." This study suggested that a tangible social network system might have some merit: people can associate physical objects with particular people, and arrangements of these objects contain social meaning.

Evaluations Two and Three: Response to the prototype. Evaluation Two, or the "short-term study," was conducted with twelve subjects, 7 male, 5 female. They were recruited via email, all were undergraduate or graduate students. Each session included three subjects; four sessions were conducted. Each session lasted around one and a half hours. The subjects were each given one friendFrame and six connectibles: two buttons, two knobs, and two pics. They were also provided with a Mac Mini running the visualization application. The subjects were placed in the same room and physically separated by foam core walls, preventing them from seeing what the other subjects were doing. This separation also simulated a condition in which the subjects were in different locations.

The subjects had the experiment explained to them orally and in writing. The subjects were provided with paper faceplates, markers, pens and stickers with which to customize and decorate the button and knob connectibles. Subjects were invited to exchange connectibles, if they chose, with any of the other subjects, at any time. Subjects were invited to use the connectibles to communicate, to use the visualization application, and to rearrange the connectibles, if they chose. Technical assistance was provided if the users encountered any problems or had any questions; the system functioned fairly robustly. Minor problems were encountered, but these were resolved in less than thirty seconds or so. Overall, the study took a relatively freeform approach, inviting subjects to use the system in any way they saw fit. They were asked to provide any comments orally, if they chose; these comments were written down. The subjects were presented with a written survey at the end of the session. Both the subjects' comments and observation of their behavior led to a list of results. Evaluation Two was obviously too short for the subjects to fully use the system for its intended purpose. While it was attempted to set up groups of subjects that had pre-existing friendships, such that they would have some motivation to use Connectibles, this could not be completely controlled for. However, the short-term study did permit using a larger number of subjects.

In order to remove the confounding conditions of the short-term study, a seven day investigation with three subjects, Evaluation Three ("the long-term study"), was performed. This study's subjects were all male. Two were students, the other was postdoctoral research staff. This study simulated more realistic conditions. The friendFrames were located in the subjects' real workplaces. Two of the subjects worked on opposite sides of a large office space. Lab equipment prevented them from seeing one another while they were at their desks. The third subject worked in a different office on the same floor. The subjects knew one another, were friendly, and worked together, providing a pre-existing impetus for social behavior. Given the length of time this experiment took and the constraints on appropriate subjects, one session was run.

This experiment took the same freeform approach of the short-term study; subjects were welcome to use Connectibles however they chose. Like the short-term study, each subject was given two knobs, two buttons and two pics, as well as faceplates and access to markers, pens and stickers. Subjects were asked to fill out a short survey at the end of each day, as well as a long survey at the end of the experiment. These two evaluations yielded a number of results. Subjects had a number of suggestions for the system, both in terms of specific improvements to the current design, as well as new possible features. Some subjects had mixed reactions to the concept; they noted that it was something they might like to use if a number of other people were already using it. This is of course unsurprising for a networked system. Some groups of subjects used Connectibles in unpredictable ways, suggesting it provided an open interaction space.

Unlike in Evaluation One, almost all subjects did not interpret the others' arrangements in any particular way. One short-term study subject wrote, "I didn't really develop a clear logic [about my own arrangement], and did not assume that anyone else had either." This would seem to contradict the results of the first experiment. These results may have had more to do with the conditions of the experiment than the design of the Connectibles. As one subject wrote, "I'm not sure the arrangements could be that meaningful with only three connectibles per person." Clearly, the fact that only two people could be represented on a friendFrame severely limited the amount of play that could go on with the arrangements, in terms of mapping social relationships. Further, the subjects of the short-term experiment may not have had enough time nor strong enough relationships to the other subjects for any kind of mapping process to take hold.

Still, the design of Connectibles may have itself contributed to the attenuation of meaningful arrangements. First, as one subject pointed out, it was not that easy to move the connectibles around the friendFrame. The act of plugging them into a cell felt more permanent than sliding pieces of cardboard around. The friendFrame itself also lent a more stable, furniture-like feel to the system. In that sense, the system design emphasized its role in ambient social connection more than its role as a facile tangible interface.

The subjects enjoyed the customization process particularly in the context of the exchange; it allowed them to both establish the message semantics as well as invest a little bit of themselves into the connectibles they gave away. A few joked about taking back the connectibles if the recipient was not responsive. It was clear via observation that the gift giving aspect of the system was well understood and clearly endowed the connectibles with symbolic meaning as indicators of a social link.

Two of the four groups of short-term subjects did not establish much of an interaction language with the connectibles, in terms of assigning meaning to the messages. Many noted, again, that there was not enough time to do so. The buttons seemed the most arbitrary. However, the other two connectibles did take on some straightforward meanings. Most subjects correlated the knob settings with overall mood. The pic connectibles supported emoticons, which had clear interpretations. One group in particular quickly endowed the connectibles with strong (and humorous) meanings. These subjects customized most of the connectibles with written, imperative messages. For example, one subject decorated a knob which, when changed, told its receiver how loudly to demand Oreos from someone nearby. These subjects had a lot of fun with Connectibles, and built their own personal game with it, in a way that had not been predicted. This result demonstrated that people can endow the purposely abstract connectible messages with personal meaning.

This group also begs the question as to why they had a different experience than the others. They clearly already knew each other well (as they indicated on the written survey); their relationships were already informal, friendly and playful. This fact made it clear that the Connectibles system, which is meant to support intimate and friendly relationships, offers little to social groups built on formal or weak relationships. The long-term subjects generated some specific, rich semantics for the connectibles, especially the knobs and pics. Apart from the buttons, they did not have trouble assigning meanings to the messages. For example, one subject decorated a knob to indicate his current belief that his research would bear fruit.

However, it took these subjects a couple of days of using the system to settle on some meanings. After a few days, two of them decided to use the picture connectibles to show the other where they were on campus. Four pictures respectively indicated "in the office," "in the lab," "in a fabrication lab somewhere else on campus," and "at home." These observations suggest that Connectibles can indeed support a rich and varied set of user generated semantics. However, the participants need to be able to use the system for a longer period of time and have some pre-existing relationships. This, of course, bodes well for a fully implemented system.

Subjects also wanted more feedback about the state of other people's connectibles. For example, the painted pointer on the knob was not sufficient feedback as to the state of its partner. The visualization application could have reflected the state of the knobs and pics as well, instead of just their position on the friendFrame. All these observations point to greater, more salient feedback and a tighter coupling between the physical state of the connectibles and their virtual representations. It was clear that subjects wanted greater insight into the behaviors and actions of other users, which is a very positive sign for a social networking application.

A tangible social network is not a PC-based social network. Most importantly, when subjects were explicitly asked to compare Connectibles to virtual social networks, almost none of them found them to satisfy the same needs. There were a few common remarks. First, Connectibles was about deeper, and thus fewer, social relationships. That also meant that the types of social behavior a tangible social network should support are different than those a virtual social network should. One subject wrote, "Connectibles is more suited for the few most intimate [people] in your lives, that you want constant 'connections.' Web-based [social networks are more suited for] the mass friends in your life." A sense of social connection is more important with one's inner circle. This subject seems to indicate that this kind of communication is different than what one might want or need from a PC-based social network.

One subject summed up key aspects of the system, writing, "The physical objects are nice. They feel like you've exchanged a real thing. Unlike the stupid 'gifts' you can buy for people on Facebook." Another wrote, "The physical objects are more personally meaning and precious." Another said, "There's something about the token aspect and the desire for a connection that makes me think of memories as well as social networks. In that way, I think I would use [Connectibles] in situations and relationships that I would like to remember." The physicality was clearly important, especially for establishing a sense of social connection.

The series of evaluations revealed a lot of new directions for the invention. They also indicated that the idea has promise, since many users left with positive impressions of the system. The evaluations indicated that the system works best for people who have pre-existing, friendly social relationships, which bears out a hypothesis of the Connectibles design. By the same token, users who do not have strong relationships with other participants do not easily see Connectibles' value. Most important, the physicality of the design seemed critical to almost all the subjects; physical objects clearly embodied a deeper sense of social connection than virtual representations of social relationships. This fact supports the theoretical claim of the importance of objects as symbols of social relationships.

The invention is therefore a new kind of tangible social network application rooted in physical objects and real world social behavior. The prototype demonstrated the promise such a system has for allowing people to feel intimately socially connected to their friends and family. Tangible social networks implicitly map the properties of the social world onto the physical world, a connection only recently broken by digital media. This mapping is beneficial in three principal ways. First, unlike virtual social networks, tangible social networks keep social behavior in a familiar realm—the physical world. Second, tangible social networks naturally prune out very weak relationships. Because the exchange of physical objects is sufficiently costly, relationships represented by them are likely to be honest. Third, tangible social networks benefit from the general advantages of tangible user interfaces: they allow fully embodied, natural physical interactions. One must interact with virtual social networks via a GUI and its limitations—its single point of control (the cursor), its inability to properly take advantage of foreground and background attention, the difficulty it presents in working collaboratively in real-time. Finally, you can't spam someone with a tangible interface.

Most importantly, the physicality of the system generated an enthusiastic response among the subjects. Tangible interfaces are often criticized for their cost: physical things cannot be easily copied and distributed, they can become worn over time, they are hard to replace. In this case, it is precisely these properties that engendered the users' positive response. The theoretical framework suggested that signals in the form of physical objects would better represent close social relationships than purely virtual signals. These two different kinds of media entail different inherent costs; these costs influence how reliably these media can signal the strength of a social relationship. This framework led to the idea that customizable, physical gifts entail greater costs in the domain of the quality being signaled—the strength and existence of a social relationships—than generic, inexpensive virtual signals. The higher costs inherent in a physically based system tacitly cause users to signal only their close relationships, pruning out weak acquaintances and strangers. The invention addresses some of the limitations of PC-based social networks, providing a new way to harmoniously support social behavior in the physical and virtual worlds.

While a preferred embodiment of the invention is disclosed herein, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. A tangible social network system, comprising:
   at least two interactive physical objects, each interactive physical object being adapted for communicatively linking with at least one other interactive physical object, each interactive physical object comprising:
      an interactive physical object housing;
      an interactive physical object controller, the controller being located within the housing and adapted for:
         forming a communicatively linked relationship with at least one other interactive physical object;
         receiving and processing commands and data received from the linked interactive physical object; and
         generating at least one response command in response to the received commands and data; and
      at least one interactive physical object response subsystem, the interactive physical object response subsystem adapted for displaying at least one visual or audio response to a response command received from the controller;
   at least one object communication frame, each object communication frame being capable of displaying at least one interactive physical object, each object communication frame comprising:
      an object communication frame housing, the object communication frame housing being adapted to receive installation of the interactive physical object;
      an object communication frame communications subsystem, the object communication frame communications subsystem being adapted for receiving and managing communications with, and communications between, the installed interactive physical object and an interactive physical object that is communicatively-linked to the installed interactive physical object; and
      an object communication frame controller, the object communication frame controller being located within the housing and being adapted for:
         receiving and processing commands and data received from the communications subsystem; and
         generating at least one response command or data in response to the received commands and data; and
   at least one tangible social network visualization application, each tangible social network visualization application being adapted for providing a visual representation of the tangible social network of a user, each tangible social network visualization application comprising:
      a tangible social network visualization application communications subsystem adapted for receiving information about the composition of a tangible social network of a user, the tangible social network comprising at least one set of linked interactive physical objects;
      a tangible social network visualization subsystem adapted for deriving a representation of the tangible social network of the user from the information received by the communications subsystem; and
      a graphical user interface adapted for providing the representation of the tangible social network to the user in a visual form.

2. The system of claim 1, the interactive physical object controller being further adapted for:
   receiving and processing commands and data received from at least one tangible social network visualization application; and
   generating at least one response command in response to the received visualization application commands and data.

3. The system of claim 1, at least one interactive physical object further comprising at least one interactive physical object user interface capable of accepting direct user input.

4. The system of claim 1, wherein, for at least one tangible social network visualization application, the graphical user interface is further adapted for accepting user commands and data related to management of the tangible social network, and the tangible social network visualization application communications subsystem is further adapted for sending user-generated interactive physical object commands to at least one of the linked interactive physical objects, the tangible social network visualization application further comprising an interactive physical object manipulation subsystem adapted for deriving the user-generated interactive physical object commands from the received user commands or data.

5. The system of claim 1, at least one object communication frame further comprising at least one object communication frame user interface capable of accepting direct user input.

6. The system of claim 1, wherein, for at least one object communication frame, the object communication frame controller being further adapted for:
   receiving and processing commands and data received from at least one tangible social network visualization application; and
   generating at least one response command in response to the received visualization application commands and data.

7. The system of claim 1, wherein the communicatively linked relationship formed by the interactive physical object with the at least one other interactive physical object is a communicatively linked exclusively-paired relationship, such that the interactive physical object and the linked exclusively-paired interactive physical object form a dedicated communications channel.

8. The system of claim 7, the interactive physical object further comprising at least one user interface capable of accepting direct user input.

9. The system of claim 3, the interactive physical object further comprising at least one user control feedback device capable of providing confirmation to a user that user input has been received.

10. The system of claim 7, the interactive physical object controller being further adapted for:
    receiving and processing commands and data received from at least one tangible social network visualization application; and
    generating at least one response command in response to the received visualization application commands and data.

11. The system of claim 1, the interactive physical object further comprising an on-board power source.

12. The system of claim 1, wherein the interactive physical object is customizable by a user.

13. The system of claim 3, the user interface comprising at least one of a button or an adjustable knob.

14. The system of claim 1, the response subsystem comprising at least one of a video display, a light emitting diode, or an audio device.

15. The system of claim 1, wherein the interactive physical object is physically connectible directly to at least one of at least one other interactive physical object or at least one object communication frame.

16. The system of claim 1, the interactive physical object communication frame further comprising
    an interactive physical object power subsystem adapted for providing power to installed interactive physical objects.

17. The system of claim 1, the object communication frame controller being further adapted for:
    receiving and processing commands and data received from at least one tangible social network visualization application; and
    generating at least one response command in response to the received visualization application commands and data.

18. The system of claim 1, the object communication frame further comprising at least one object communication frame user interface capable of accepting direct user input.

19. The system of claim 18, the object communication frame further comprising at least one object communication frame user control feedback device capable of providing confirmation to a user that user input has been received.

20. The system of claim 1, the object communication frame further comprising at least one object communication frame response subsystem, the object communication frame response subsystem being adapted for displaying at least one visual or audio response to a response command received from the object communication frame controller.

21. The system of claim 20, the object communication frame response subsystem comprising at least one of a video display, a light emitting diode, or an audio device.

22. The system of claim 1, wherein the object communication frame communications subsystem communicates with the communicatively linked interactive physical objects via a computing or internet-based device.

23. The system of claim 1, the object communication frame communications subsystem being further adapted to send and receive commands and data to and from a tangible social network management application.

24. The system of claim 1, wherein the object communication frame is physically extensible by connection to at least one other object communication frame.

25. The system of claim 1, the tangible social network visualization application communications subsystem being further adapted for receiving information about the composition of tangible social networks of other users and the graphical user interface being further adapted for providing representations to the user of the tangible social networks of other users.

26. The system of claim 1, the tangible social network visualization application communications subsystem being further adapted for receiving and sending information and user-generated interactive physical object commands to and from an object communication frame.

27. The system of claim 1, wherein
    the tangible social network visualization application communications subsystem is further adapted for:
        receiving information about the composition of a tangible social network of at least one user, the tangible social network of the user comprising at least one set of communicatively linked exclusively-paired interactive physical objects, wherein each pair of communicatively linked exclusively-paired interactive physical object forms a dedicated communications channel; and
        sending user-generated interactive physical object commands to at least one of the communicatively linked interactive physical objects; and
    the graphical user interface is further adapted for:
    accepting user commands and data related to management of the tangible social network of the user; and
    the system further comprises an interactive physical object manipulation subsystem adapted for deriving the user-generated interactive physical object commands from the received user commands or data.

28. The system of claim 27, the graphical user interface being further adapted for providing representations to the user of the tangible social networks of other users.

* * * * *